US009236911B2

(12) United States Patent
Johnson et al.

(10) Patent No.: US 9,236,911 B2
(45) Date of Patent: Jan. 12, 2016

(54) SECURE TRANSFER OF WHITEBOARD CONTENT

(71) Applicant: Intel Corporation, Santa Clara, CA (US)

(72) Inventors: Erik J. Johnson, Portland, OR (US); Jasmeet Chhabra, Hillsboro, OR (US); Rita H. Wouhaybi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 13/729,616

(22) Filed: Dec. 28, 2012

(65) Prior Publication Data

US 2014/0187152 A1    Jul. 3, 2014

(51) Int. Cl.
*H04B 5/00* (2006.01)
*H04B 7/24* (2006.01)
*H04W 4/00* (2009.01)

(52) U.S. Cl.
CPC .................................. *H04B 5/0031* (2013.01)

(58) Field of Classification Search
USPC ........................................ 455/41.1, 41.2, 566
See application file for complete search history.

(56) References Cited

U.S. PATENT DOCUMENTS

| 8,554,282 | B2* | 10/2013 | Chang | 455/566 |
| 2002/0113773 | A1* | 8/2002 | McDonnell et al. | 345/156 |
| 2008/0057867 | A1* | 3/2008 | Trappeniers et al. | 455/41.2 |
| 2009/0286477 | A1* | 11/2009 | Braun | 455/41.2 |
| 2013/0189924 | A1* | 7/2013 | Pedro et al. | 455/41.1 |
| 2014/0047487 | A1* | 2/2014 | Guedalia et al. | 725/80 |
| 2014/0063262 | A1* | 3/2014 | Edwards et al. | 348/159 |
| 2014/0134947 | A1* | 5/2014 | Stouder-Studenmund | 455/41.2 |

OTHER PUBLICATIONS

NFC Forum, Inc., "NFC Data Exchange Format (NDEF)," Technical Specification, NDEF 1.0, NFCForum-TS-NDEF_1.0, Jul. 24, 2006, 25 pages.
Negi et al., "System, Devices, and Method for Proximity-Based Parental Controls," U.S. Appl. No. No. 13/631,449, filed Sep. 28, 2012, 34 pages.

* cited by examiner

*Primary Examiner* — Blane J Jackson
(74) *Attorney, Agent, or Firm* — Barnes & Thornburg LLP

(57) ABSTRACT

Technologies for securely transferring whiteboard content data from a smart whiteboard device to another smart whiteboard device are disclosed. The smart whiteboard device may securely transfer the whiteboard content data to a mobile device. In response to receiving the whiteboard content data from the smart whiteboard device, the mobile device may transfer the received whiteboard content data to the other smart whiteboard device. The other smart whiteboard device may display the transferred whiteboard content data and enable manipulation thereof.

16 Claims, 7 Drawing Sheets

SECURE TRANSFER OF WHITEBOARD CONTENT

BACKGROUND

Conventional whiteboards are used to display content, such as drawings, handwriting, schematics, text, diagrams, and the like, to people in the near vicinity of the whiteboards. They enable people to create and manipulate such content on the whiteboards themselves. As a result, conventional whiteboards are often used as collaborative tools and are typically found in offices, conference rooms, classrooms, or any other location in which collaboration between multiple people is beneficial. However, due to their static nature, it is often difficult to preserve the content created on a conventional whiteboard. For example, in order to preserve content created on a conventional whiteboard, a person must typically transcribe the contents of the whiteboard onto a physical medium such as paper, or they must take a picture of the contents.

Smart whiteboards are also used to display content to people in the near vicinity of the smart whiteboards. Like conventional whiteboards, smart whiteboards may be used by people to create and manipulate content on the smart whiteboards themselves. However, smart whiteboards differ from conventional whiteboards in that they electronically display content generated by a user. Although such content is electronically displayed to the user, it is oftentimes still difficult to preserve user-generated content. Additionally, due to the difficulties in preserving content generated on smart whiteboards, transferring content from one smart whiteboard to another is challenging. For example, content generated on one smart whiteboard must typically be transcribed onto paper and then re-drawn on the other smart whiteboard.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
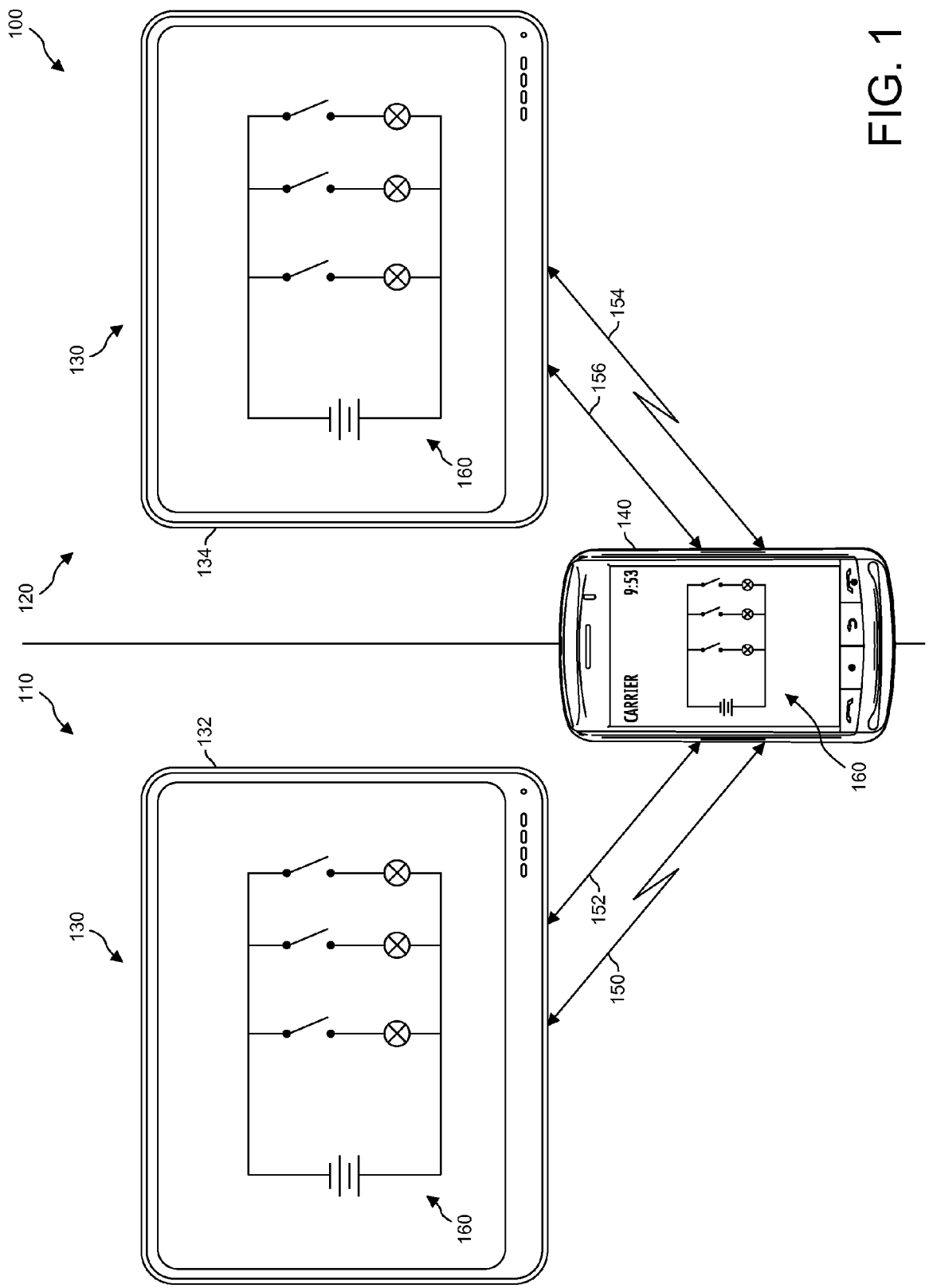
FIG. 1 is a simplified block diagram of at least one embodiment of a system for securely transferring digitized content between smart whiteboard devices using a mobile computing device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a system 100 for securely transferring content between whiteboard devices includes one or more smart whiteboard devices 130 and a mobile computing device 140 (or a mobile device), which are capable of bi-directional communication with each other as discussed in more detail below. In use, the smart whiteboard devices 130 are configured to receive and display content (e.g., drawings, handwriting, schematics, text, diagrams, etc.) created by a user using the smart whiteboard devices 130 themselves. That is, the user may create (e.g., draw) new content or manipulate existing content directly on the smart whiteboard devices 130. In response, the smart whiteboard devices 130 are configured to display a digitized representation of the new or updated content to the user on one or more associated displays, which are typically embedded within the smart whiteboard devices 130 themselves.

In some embodiments, the digitized content created and/or manipulated on one of the smart whiteboard devices 130 may be transferred to another one of the smart whiteboard devices 130 using the mobile computing device 140 as an intermediary. For example, content 160 created using a smart whiteboard device 132 in one location 110 may be transferred to a smart whiteboard device 134 in another location 120 for subsequent display and manipulation by the user. To do so, the smart whiteboard device 132 and the mobile computing device 140 may establish a wireless communication channel 150 using short-range communications such as, for example, near field communications. The wireless communication channel 150 may then be used to establish another communication channel 152 (e.g., Wi-Fi®, Bluetooth®, WiMAX, Ethernet, etc.) over which the smart whiteboard device 132 may transfer the digitized content 160 to the mobile computing device 140. Thereafter, the mobile computing device 140 may transfer the received digitized content 160 to the smart whiteboard device 134. To do so, the mobile computing device 140 may establish a wireless communication channel 154 with the smart whiteboard device 134 also using short-range communications such as, for example, near field communications. The wireless communication channel 152 may then be used to establish another communication channel 156 (e.g., Wi-Fi®, Bluetooth®, WiMAX, Ethernet, etc.) over which the mobile computing device 140 may transfer the received digitized content 160 to the smart whiteboard device 134. The smart whiteboard device 134 may then display a digitized representation of the content 160 received from the mobile computing device 140 on one or more associated displays.

In some embodiments, the smart whiteboard device 132 may also generate and display/provide a near field communications (NFC) tag or a Quick Response (QR) code, which may be captured (e.g., read) by the mobile computing device 140. Subsequently, the mobile computing device 140 may display and/or provide the NFC tag and/or QR code to another one of the smart whiteboard devices 130 (e.g., the smart whiteboard device 134) to facilitate transfer of the digitized content 160. In such embodiments, the NFC tag and/or QR code may include a uniform resource locator (URL) or a network address (e.g., an Internet Protocol address) of a web server executing on, or accessible to, the smart whiteboard device 132 from which the digitized content 160 may be directly retrieved (e.g., downloaded, accessed, obtained, etc.). Thereafter, the other smart whiteboard device 134 may read the NFC tag provided by, or capture the QR code displayed by, the mobile computing device 140. The NFC tag or QR code may be decoded by the other smart whiteboard device 134 to obtain the URL (or network address) of the web server executing on, or accessible to, the smart whiteboard device 132. Using the URL and/or network address, the smart whiteboard device 134 may then connect to the web server executing on, or accessible to, the smart whiteboard device 132 to directly retrieve (e.g., download, access, obtain, etc.) the digitized contents 160 from the smart whiteboard device 132.

In some embodiments, the smart whiteboard device 132 may also generate an NFC tag that contains the digitized content 160 (e.g., via NFC Data Exchange Format). In such embodiments, the mobile computing device 140 may read or otherwise obtain the NFC tag including the digitized contents 160 from the smart whiteboard device 132 using an NFC communication channel, such as, for example, the wireless communication channel 150. Thereafter, the mobile computing device 140 may make the NFC tag including the digitized contents 160 available to be read or otherwise obtained by the other smart whiteboard device 134 using an NFC communication channel such as, for example, the wireless communication channel 154.

The mobile computing device 140 may be embodied as any type of mobile computing device and/or mobile device capable of performing the functions described herein including, but not limited to, a mobile phone, a smart phone, a tablet computing device, a personal digital assistant, a messaging device, a consumer electronic device, a handset, a laptop computer, and/or any other mobile computing/communication device.

Figure 2:
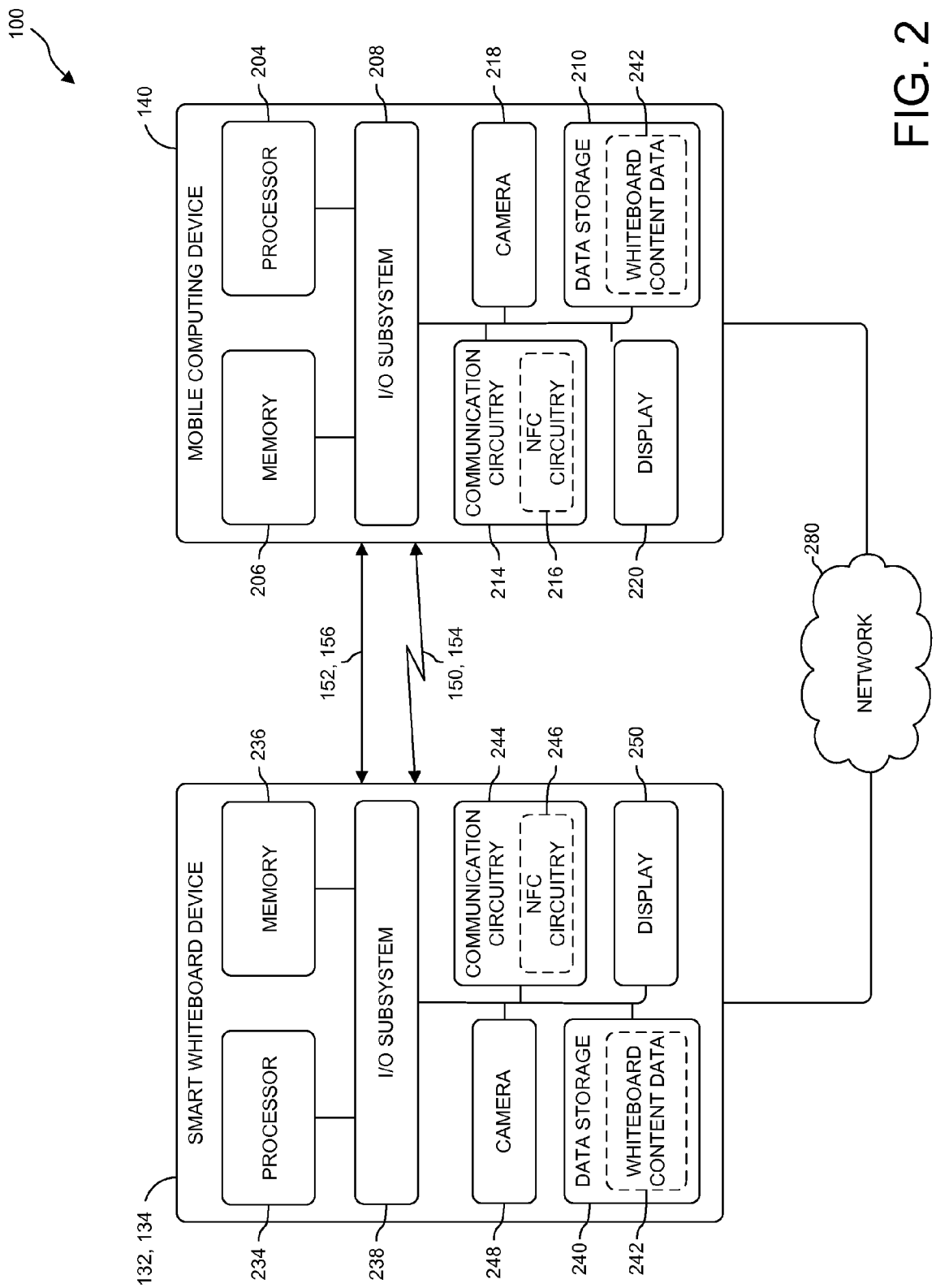
FIG. 2 is a simplified block diagram of at least one embodiment of the mobile computing device and the smart whiteboard devices of the system of FIG. 1.

The smart whiteboard devices 130 may be embodied as any type of smart whiteboard device for receiving and displaying digital information generated by a user and performing the functions described herein. Although only two smart whiteboard devices 130 (e.g., the smart whiteboard device 132 and the smart whiteboard device 134) are shown in FIG. 1, it should be appreciated that the system 100 may include any number of (e.g., multiple) smart whiteboard devices 130 in other embodiments. As shown in FIG. 2, the illustrative smart whiteboard devices 132, 134 each includes a processor 234, a memory 236, an input/output (I/O) subsystem 238, a data storage device 240, communication circuitry 244, a camera 248, and a display 250. Of course, the smart whiteboard devices 132, 134 may include other or additional components, such as those commonly found in a smart whiteboard device and/or computer (e.g., various input/output devices), in other embodiments. Additionally, in some embodiments, one or more of the illustrative components may be incorporated in, or otherwise from a portion of, another component. For example, the memory 236, or portions thereof, may be incorporated in the processor 234 in some embodiments.

The processor 234 may be embodied as any type of processor capable of performing the functions described herein. For example, the processor 234 may be embodied as a single or multi-core processor(s), digital signal processor, microcontroller, or other processor or processing/controlling circuit. Similarly, the memory 236 may be embodied as any type of volatile or non-volatile memory or data storage capable of performing the functions described herein. In operation, the memory 236 may store various data and software used during operation of the smart whiteboard devices 132, 134 such as operating systems, applications, programs, libraries, and drivers. The memory 236 is communicatively coupled to the processor 234 via the I/O subsystem 238, which may be embodied as circuitry and/or components to facilitate input/output operations with the processor 234, the memory 236, and other components of the smart whiteboard devices 132, 134. For example, the I/O subsystem 238 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 238 may form a portion of a system-on-a-chip (SoC) and be incorporated, along with the processor 234, the memory 236, and other components of the smart whiteboard devices 132, 134, on a single integrated circuit chip.

The communication circuitry 244 of the smart whiteboard devices 132, 134 may be embodied as any communication circuit, device, or collection thereof, capable of enabling communications between the smart whiteboard devices 132, 134, the mobile computing device 140, and/or other computing devices. The communication circuitry 244 may be configured to use any one or more communication technology (e.g., wireless or wired communications) and associated protocols (e.g., Ethernet, Wi-Fi®, WiMAX, etc.) to effect such communication. In some embodiments, the smart whiteboard devices 132, 134 may communicate with each other and/or with the mobile computing device 140 over a network 280. The network 280 may be embodied as any number of various wired and/or wireless communication networks. For example, the network 280 may be embodied as or otherwise include a local area network (LAN), a wide area network (WAN), a cellular network, or a publicly-accessible, global network such as the Internet. Additionally, the network 280 may include any number of additional devices to facilitate communication between the smart whiteboard devices 132, 134, the mobile computing device 140, and/or the other computing devices.

In some embodiments, the communication circuitry 244 of the smart whiteboard devices 132, 134 may also include NFC circuitry 246 to facilitate short-range wireless communications 150, 154 with other computing devices such as, for example, the mobile computing device 140. In some embodiments, the NFC circuitry 246 may enable for communication ranges on the order of a few centimeters. It should be understood that the communication circuitry 244 of the smart whiteboard devices 132, 134 may, additionally or alternatively, include other types short-range communication circuitry and associated protocols to facilitate short-range wireless communications 150, 154 with other computing devices. For example, the communication circuitry 244 of the smart whiteboard devices 132, 134 may be embodied as Bluetooth® communication circuitry, infrared communication circuitry, or any other short-range communication circuitry suitable for use in communicating with the mobile computing device 140.

The data storage 240 may be embodied as any type of device or devices configured for short-term or long-term storage of data such as, for example, memory devices and circuits, memory cards, hard disk drives, solid-state drives, or other data storage devices. In the illustrative embodiment, the smart whiteboard devices 132, 134 may maintain whiteboard content data 242 in the data storage 240. The whiteboard content data 242 embodies a digitized representation of content (e.g., the digitized content 160) generated on the smart whiteboard devices 132, 134 by the user and displayed on the display 250. For example, the whiteboard content data 242 may be embodied as static digital images, vector graphics, video, text, and/or other multi-media data representative of the content generated by the user and being displayed on the display 250 of one or more of the smart whiteboard devices 132, 134. As discussed in more detail below, in some embodiments, the whiteboard content data 242 generated on one smart whiteboard device (e.g., the smart whiteboard device 132) may be transferred to another smart whiteboard device (e.g., the smart whiteboard device 134) for display. In such embodiments, the mobile computing device 140 may be used as an intermediary device (e.g., a proxy device) to facilitate transfer of the whiteboard content data 242 between the smart whiteboard devices 132, 134. Of course, in other embodiments, the smart whiteboard devices 132, 134 may maintain additional or other types of data in the data storage 240.

The camera 248 may be embodied as any type of camera, such as a still camera, a video camera, or the like, that is capable of capturing a visual image of an object displayed by the smart whiteboard devices 132, 134 and/or the mobile computing device 140. For example, the camera 248 may be embodied as a digital camera (e.g., a digital point-and-shoot camera, a digital single-lens reflex (DSLR) camera, etc.) for capturing a QR code displayed by the mobile computing device 140 to facilitate short-range communications 150, 154. In some embodiments, the camera 248 may be incorporated into a housing of the smart whiteboard devices 132, 134, or may be a peripheral device communicatively coupled to the smart whiteboard devices 132, 134. For example, the camera 248 may be incorporated near a display screen (e.g., the display 250) of the smart whiteboard devices 132, 134 or positioned in the proximity of the smart whiteboard devices 132, 134.

The display 250 of the smart whiteboard devices 132, 134 may be embodied as any one or more display screens on which information may be displayed to a user or viewer of the smart whiteboard devices 132, 134. The display 250 may be embodied as, or otherwise use, any suitable display technology including, for example, a liquid crystal display (LCD), a light emitting diode (LED) display, a cathode ray tube (CRT) display, a plasma display, and/or other display technology currently known or developed in the future. Although only a single display 250 is illustrated in FIG. 2, it should be appreciated that the smart whiteboard devices 132, 134 may each include multiple displays or display screens on which the same or different content may be displayed contemporaneously or sequentially with each other. Additionally, it should be understood that the display 250 may also be embodied as a capacitive touchscreen configured to receive input from the user. For example, the display 250 may be configured to display content (e.g., drawings, handwriting, schematics, text, diagrams, etc.) created by the user using the display 250 for input. In embodiments wherein the display 250 includes a capacitive touchscreen, the display 250 may also be configured to display content manipulated (e.g., revised) by the user using the display 250 for input.

The illustrative mobile computing device 140 includes a processor 204, a memory 206, an input/output subsystems 208, a data storage 210, communication circuitry 214, and a display 220. Those components of the mobile computing device 140 may be similar to the corresponding components of the smart whiteboard devices 132, 134, the description of which is applicable to the corresponding components of the mobile computing device 140 and is not repeated herein for clarity of the description. In the illustrative embodiment, the data storage 210 may maintain the whiteboard content data 242 generated on and received from the smart whiteboard devices 132, 134. In some embodiments, the mobile computing device 140 may transfer whiteboard content data 242 received from one of the smart whiteboard devices 130 (e.g., the smart whiteboard device 132) and stored in the data storage 210, to another one of the smart whiteboard devices 130 (e.g., the smart whiteboard device 134) for display and manipulation. In that way, the mobile computing device 140 may be used as an intermediary device (e.g., a proxy device) to facilitate transfer of the whiteboard content data 242 between the smart whiteboard devices 132, 134. Of course, in other embodiments, the mobile computing device 140 may maintain additional or other types of data in the data storage 210.

In the illustrative embodiment, the communication circuitry 214 of the mobile computing device 140 may also include NFC circuitry 216 to facilitate short-range wireless communications 150, 154 with other computing devices such as, for example, the smart whiteboard devices 132, 134. In some embodiments, the NFC circuitry 216 may enable for communication ranges on the order of a few centimeters. It should be understood that the communication circuitry 214 of the mobile computing device 140 may, additionally or alternatively, include other types short-range communication circuitry and associated protocols to facilitate short-range communications 150, 154 with other computing devices. For example, the communication circuitry 214 of the mobile computing device 140 may be embodied as Bluetooth® communication circuitry, infrared communication circuitry, or any other short-range communication circuitry suitable for use in communicating with the smart whiteboard devices 132, 134.

Figure 3:
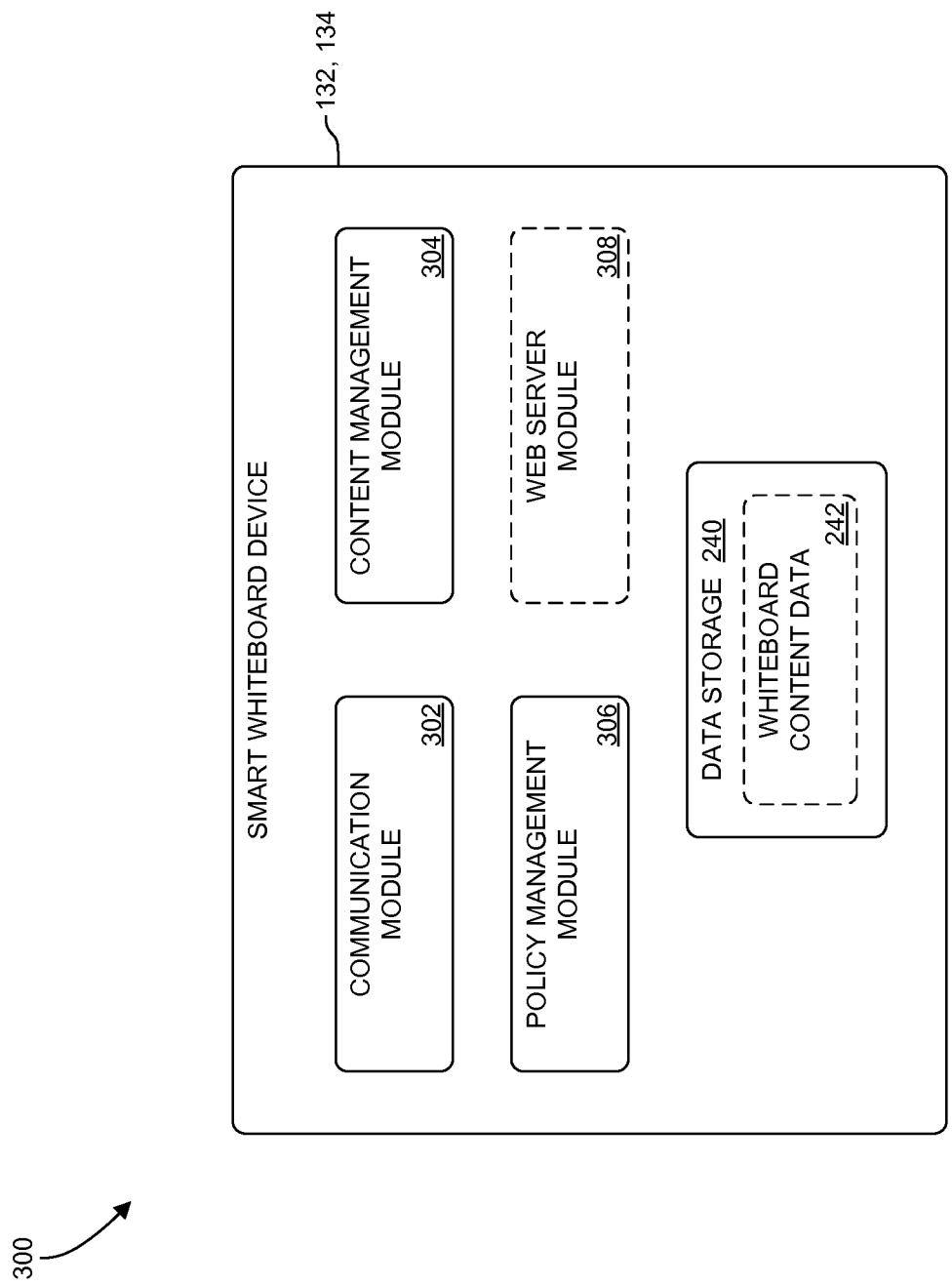
FIG. 3 is a simplified block diagram of at least one embodiment of an environment of the smart whiteboard devices of the system of FIGS. 1 and 2.

Referring now to FIG. 3, in one embodiment, each of the smart whiteboard devices 132, 134 establishes an environment 300 during operation. The illustrative environment 300 includes a communication module 302, a content management module 304, a policy management module 306, and the data storage 240, each of which may be embodied as software, firmware, hardware, or a combination thereof. It should be appreciated that the smart whiteboard devices 132, 134 may include other components, sub-components, modules, and devices commonly found in a smart whiteboard device, which are not illustrated in FIG. 3 for clarity of the description. Additionally, it should be understood that although each of the smart whiteboard devices 132, 134 may establish the illustrative environment 300 during operation, the following discussion of that illustrative environment 300 is described with specific reference to the smart whiteboard device 132 for clarity of the description.

The communication module 302 of the smart whiteboard devices 132 facilitates communications with the mobile computing device 140. As discussed, the smart whiteboard device 132 may transfer whiteboard content data 242 to the mobile computing device 140 for storage and subsequent transfer to another one of the smart whiteboard devices 130 (e.g., the smart whiteboard device 134). In such embodiments, the communication module 302 may initially establish a communication channel 150 with the mobile computing device 140 using the short-range wireless communications (e.g., NFC communications). Thereafter, the communication channel 150 may be utilized to establish another communication channel 152 over which the communication module 302 may transmit the whiteboard content data 242 to the mobile computing device 140 using a different communication protocol (e.g., Ethernet, Wi-Fi®, WiMAX, Bluetooth®, etc.).

Additionally or alternatively, the smart whiteboard device 132 may receive, in some embodiments, whiteboard content data 242 from another one of the smart whiteboard devices 130 (e.g., the smart whiteboard device 134) using the mobile computing device 140 as an intermediary device (e.g., a proxy device). In such embodiments, the communication module 302 may initially establish a communication channel 154 with the mobile computing device 140 using the short-range wireless communications (e.g., NFC communications). Thereafter, the communication channel 154 may be utilized to establish another communication channel 156 over which the communication module 302 may receive the whiteboard content data 242 from the mobile computing device 140 using a different communication protocol (e.g., Ethernet, Wi-Fi®, WiMAX, Bluetooth®, etc.).

The communication module 302 may also facilitate communications between the smart whiteboard device 132 and one or more other smart whiteboard devices 130 (e.g., the smart whiteboard device 134). In such embodiments, the communication module 302 of the smart whiteboard device 132 may communicate with the one or more other smart whiteboard devices 130 (e.g., the smart whiteboard device 134) over the network 280. The communication module 302 of the smart whiteboard device 132 may also facilitate direct communications with the mobile computing device 140 and/or the one or more other smart whiteboard devices 130 (e.g., the smart whiteboard device 134) without using the network 280 (e.g., the communication channel 150, 152, 154, 156).

The communication module 302, in some embodiments, may transfer whiteboard content data 242 to the mobile computing device 140 for storage and subsequent transfer to one or more other computing devices (e.g., a desktop computer, a mobile phone, a smart phone, a tablet computing device, a personal digital assistant, a messaging device, a consumer electronic device, a handset, a storage server, a laptop computer, and/or any other computing device). In such embodiments, the communication module 302 may first establish a communication channel 150 with the mobile computing device 140 using short-range communication exchanges (e.g., NFC communication exchanges). Thereafter, the communication channel 150 may be used to establish another communication channel 152 with the mobile computing device 140. The other communication channel 152 established between the smart whiteboard device 132 and the mobile computing device 140 may be established using one or more different communication protocols (e.g., Ethernet, Wi-Fi®, WiMAX, Bluetooth®, etc.). The communication module 302 may then transmit the whiteboard content data 242 to the mobile computing device 140 using the other communication channel 152. The mobile computing device 140 may subsequently transfer the received whiteboard content data 242 to the one or more other computing devices using one or more other communication exchanges (e.g., NFC communication exchanges, Bluetooth® communication exchanges, Wi-Fi®, WiMAX, Ethernet, infrared communication exchanges, etc.).

The policy management module 306 may enforce one or more policies regarding the transfer of the whiteboard content data 242 to/from the mobile computing device 140 and/or the one or more other smart whiteboard devices 130. For example, in embodiments wherein the mobile computing device 140 is used as an intermediary device for securely transferring content between the smart whiteboard device 132 and one or more other smart whiteboard devices 130, the policy management module 306 may enforce one or more rules that enable (e.g., allow, permit, etc.) the transfer of the whiteboard content data 242 to the mobile computing device 140 only in response to successfully authenticating the mobile computing device 140 (e.g., via a unique device identification of the mobile computing device 140, comparing a PIN provided by the user and received from the mobile computing device 140, and/or any other suitable mechanism for authenticating the mobile computing device 140) and/or the user of the mobile computing device 140 (e.g., via challenge-response, third party authentication, security tokens, biometric comparisons, etc.). In some embodiments, the rules enforced by the policy management module 306 may be stored in the data storage 240 of the smart whiteboard device 132 or they may be stored in another suitable location of the smart whiteboard device 132.

Additionally or alternatively, the policy management module 306 may enforce one or more policies regarding the use of the smart whiteboard device 132 as a function of the proximity of the mobile computing device 140 with respect to the smart whiteboard device 132. For example, the policy management module 306 may enforce one or more rules that enable (e.g., allow, permit, etc.) the user to view and/or manipulate whiteboard content in response to determining that the mobile computing device 140 is located in a close proximity (e.g., located within a reference range) to the smart whiteboard device 132. To do so, the policy management module 306 may be configured to determine whether the smart whiteboard device 132 is connected to, or is capable of connecting to, the NFC circuitry 216 of the mobile computing device 140. As discussed above, the NFC circuitry 246 and the NFC circuitry 216 may enable communication ranges on the order of a few centimeters. Therefore, in response to determining that the smart whiteboard device 132 is connected to or is capable of connecting to the NFC circuitry 216 of the mobile computing device 140, the policy management module 306 may infer, or otherwise determine, that the mobile computing device 140 is located in close proximity to the smart whiteboard device 132. As a function of such determination, the policy management module 306 may thereafter allow the user to view and/or manipulate the whiteboard content on the smart whiteboard device 132. It should be appreciated that although the policy management module 306 of the illustrative embodiment determines that the mobile computing device 140 is located in close proximity to the smart whiteboard device 132 as a function of determining whether the smart whiteboard device 132 is connected or is capable of connecting to the NFC circuitry 216 of the mobile computing device 140, any suitable mechanism (e.g., Global Positioning System, radio frequency triangulation, etc.) for determining proximity between the mobile computing device 140 and the smart whiteboard device 132 may also be used in other embodiments.

In some embodiments, the policy management module 306 may also enforce one or more privacy policies regarding the display of whiteboard contents on the smart whiteboard device 132. For example, the policy management module 306 may enforce one or more rules that trigger the clearing (e.g., wiping, obscuring, graying-out, covering, scrambling, etc.) of whiteboard content data 242 from the display 250 of the smart whiteboard device 132 in response to determining that the mobile computing device 140 is no longer in close proximity to the smart whiteboard device 132 (e.g., the user leaves a conference room in which the smart whiteboard device 132 is located). Additionally or alternatively, the policy management module 306 may enforce one or more rules that trigger the whiteboard content data 242 to be wiped from the display 250 in response to the whiteboard content data 242 being successfully transferred to another computing device (e.g., the mobile computing device 140 or another one of the smart whiteboard devices 130). In either of those two ways, the policy management module 306 may facilitate preventing confidential information from being accessed and/or viewed by unauthorized individuals.

It should be appreciated that although the policy management module 306 enforces one or more privacy policies in the illustrative embodiment, the policy management module 306 may also enforce or otherwise execute one or more user policies in other embodiments. The user policies may correspond to one or more preferences corresponding to the user and/or the user's interaction with one or more of the smart whiteboard devices 130 (e.g., the smart whiteboard device 132). In some embodiments, the user policies may define various actions the smart whiteboard device 132 should perform based at least in part on, or otherwise a function of, the particular content being displayed by the smart whiteboard device 132. For example, the policy management module 306 may execute a user policy that triggers the smart whiteboard device 132 to display a shortcut in response to the user generating one or more lines of programming code on the display 250. In such embodiments, the user policy may define the actions that the smart whiteboard device should take in response to the user selecting the shortcut. For example, based on the user policy, the smart whiteboard device 132 may invoke a either a local code compiler (e.g., executing on the smart whiteboard device 132) or a remote code compiler (e.g., executing on a remote computing device) in response to the user selecting the shortcut. The code generated by the user may be sent to the code compiler and, once compiled, be sent back for display on the smart whiteboard device 132. It should be appreciated that the policy management module 306 may execute any number of user policies triggering a variety of different actions, either locally on the smart whiteboard device 132, or remotely on one or more computing device external to the smart whiteboard device 132.

As discussed, the smart whiteboard device 132 may include a web server module 308 in some embodiments. In such embodiments, the web server module 308 may be configured to enable another one of the smart whiteboard devices 130 (e.g., the smart whiteboard device 134) to retrieve (e.g., download, access, obtain, etc.) the whiteboard content data 242 directly from the smart whiteboard device 132. To facilitate communications with the web server module 308, the web server module 308 may be associated with a uniform resource locator (URL) or a network address (e.g., an Internet Protocol address) accessible over the network 280. It should be appreciated although another one of the smart whiteboard devices 130 retrieves the whiteboard content data 242 directly from web server module 308 of the smart whiteboard device 132 in the illustrative embodiment, the mobile computing device 140 may also retrieve the whiteboard content data 242 directly from the web server module 308 of the smart whiteboard device 132 in embodiments wherein the mobile computing device 140 is used as an intermediary device (e.g., a proxy device) in transferring the whiteboard content data 242 between the smart whiteboard device 132 and another one of the smart whiteboard devices 130.

In some embodiments, the web server module 308 may also be configured to send the whiteboard content data 242 directly to the user. For example, the web server module 308 may be configured to transfer, or otherwise make available, the whiteboard content data 242 based at least in part on, or otherwise as a function of, a user policy associated with the with the user. For example, in some embodiments, the web server module 308 may transfer the whiteboard content data 242 to one or more devices associated with the user based on the user policy. Additionally or alternatively, the web server module 308 may also send, in some embodiments, an electronic mail (e-mail) message including the whiteboard content data 242 to one or more e-mail addresses associated with the user as a function of the user policy. In such embodiments, the web server module 308 may do so in response to the user successfully authenticating with the smart whiteboard device 132. For example, the web server module 308 may send the e-mail message in response to the user scanning an identification badge with a scanner (not shown) embedded within or communicatively coupled to the smart whiteboard device 132. To facilitate authenticating the user or the user's identification badge, the web server module 308 may communicate with a remote computing device (e.g., a remote authentication server). It should be appreciated that the e-mail message generated by the web server module 308 may include the whiteboard content data 242 as an attached file, code embedded within the body of e-mail message, and/or a download link corresponding to the URL and/or network address of the web server module 308.

The content management module 304 of the smart whiteboard device 132 facilitates the processing and/or preparation of whiteboard content data 242 that is to be transferred to or received from the mobile computing device 140 and/or another one of the smart whiteboard devices 130 (e.g., the smart whiteboard device 134). In some embodiments, the content management module 304 of the smart whiteboard device 132 digitizes or otherwise converts the content generated on the smart whiteboard device 132 by the user into whiteboard content data 242, which may be a format suitable for transferring to the mobile computing device 140 and/or another one of the smart whiteboard devices 130. In such embodiments, the content management module 304 may convert the content generated by the user and being displayed on the display 250 of the smart whiteboard device 132 into one or more static digital images, vector graphics, video, text, and/or other multi-media data representative of the content generated by the user.

In some embodiments, the content management module 304 may also generate an near field communications (NFC) tag or a Quick Response (QR) code to facilitate the transfer of the whiteboard content data 242 between the smart whiteboard device 132 and another one of the smart whiteboard devices 130 (e.g., the smart whiteboard device 134). In such embodiments, the NFC tag and/or QR code may include the URL or the network address of the web server module 308 executing on the smart whiteboard device 132 and from which the whiteboard content data 242 may be directly retrieved (e.g., downloaded, accessed, obtained, etc.). As discussed in more detail below, in some embodiments, the NFC tag and/or QR code generated by the content management module 304 may be displayed or otherwise made available by the smart whiteboard device 132 to be captured or read by the mobile computing device 140.

Additionally or alternatively, in embodiments wherein the smart whiteboard device 132 receives the whiteboard content data 242, the content management module 304 may also be configured to decode an NFC tag and/or a QR code including the URL or network address of a web server, executing on another one of the smart whiteboard devices 130 (e.g., the smart whiteboard device 134) from which the whiteboard content data 242 may be directly retrieved (e.g., downloaded, accessed, obtained, etc.). In such embodiments, the content management module 304 may retrieve the whiteboard content data 242 directly from another one of the smart whiteboard devices 130 (e.g., the smart whiteboard device 134) using the URL and/or network address from the decoded NFC tag and/or QR code. For example, the content management module 304 may retrieve the whiteboard content data 242 directly from the web server module 308 of the other smart whiteboard device 134. It should be appreciated that in embodiments wherein a QR code is decoded by the content management module 304, the smart whiteboard device 132 may capture the QR code from the display 220 of the mobile computing device 140. Additionally or alternatively, in embodiments wherein an NFC tag is decoded by the content management module 304, the smart whiteboard device 132 may read an NFC tag provided by NFC circuitry 216 of the mobile computing device 140.

As discussed, the smart whiteboard device 132 may, additionally or alternatively, generate an NFC tag that includes the digitized content 160 in some embodiments. To do so, the content management module 304 may encode or otherwise convert the whiteboard content data 242 into an NFC tag, which may be read by the NFC circuitry 216 of the mobile computing device 140. The content management module 304 may also first retrieve the whiteboard content from the data storage 240 and then encode or otherwise convert the whiteboard content data 242 into the NFC tag. It should be understood that the NFC tag generated by the content management module 304 may embodied as either a physical NFC tag or a "soft" NFC tag on the smart whiteboard device 132. In embodiments wherein the smart whiteboard device 132 receives the whiteboard content data 242, the content management module 304 may also be configured to process (e.g., decode, convert, display, etc.) an NFC tag that includes the whiteboard content data 242 and which was read from the mobile computing device 140.

As discussed, the data storage 240 maintains the whiteboard content data 242. The whiteboard content data 242 may embody a digitized representation of content (e.g., the digitized content 160) generated on the smart whiteboard device 132 by the user and displayed on the display 250. In some embodiments, the whiteboard content data 242 may be embodied as static digital images, vector graphics, video, text, and/or other multi-media data representative of the content generated by the user and being displayed on the display 250 of the smart whiteboard device 132. It should be appreciated that, in some embodiments, the whiteboard content data 242 stored in the data storage 240 and being displayed on the smart whiteboard device 132 may have been originally generated by the user on another one of the smart whiteboard devices 130 (e.g., the smart whiteboard device 134) and later transferred to the smart whiteboard device 132.

It should be understood that although the smart whiteboard devices 132, 134 are described in the illustrative embodiment of FIG. 3, other types of "smart" computing devices may be configured to transfer displayed content to the mobile computing device 140, the smart whiteboard devices 132, 134, and/or one more other computing devices in some embodiments. For example, in some embodiments, the smart whiteboard device 132 may be embodied as a digital display device for displaying information targeted to a viewer (e.g., advertising targeted to consumers, movie times, product information, product reviews, menus, nutrition information, etc.). In such embodiments, the digital display device may establish the illustrative environment 300 during operation. As such, the digital display device may be configured to first establish a communication channel 150 with the mobile computing device 140 using short-range communications such as, for example, near field communications. The communication channel 150 may then be used to establish another communication channel 152 (e.g., Wi-Fi®, Bluetooth®, WiMAX, Ethernet, etc.). The digital display device may then transfer the content being displayed to the mobile computing device 140 using the other communication channel 152. In some embodiments, the digital display device, in addition to the content being displayed, may transfer other types of information (e.g., movie times, contact information, etc.) to the mobile computing device 140 using one or more of the short range communication channel 150 and the other communication channel 152. The mobile computing device may store the received content and information for later retrieval and/or transfer to another computing device.

Figure 4:
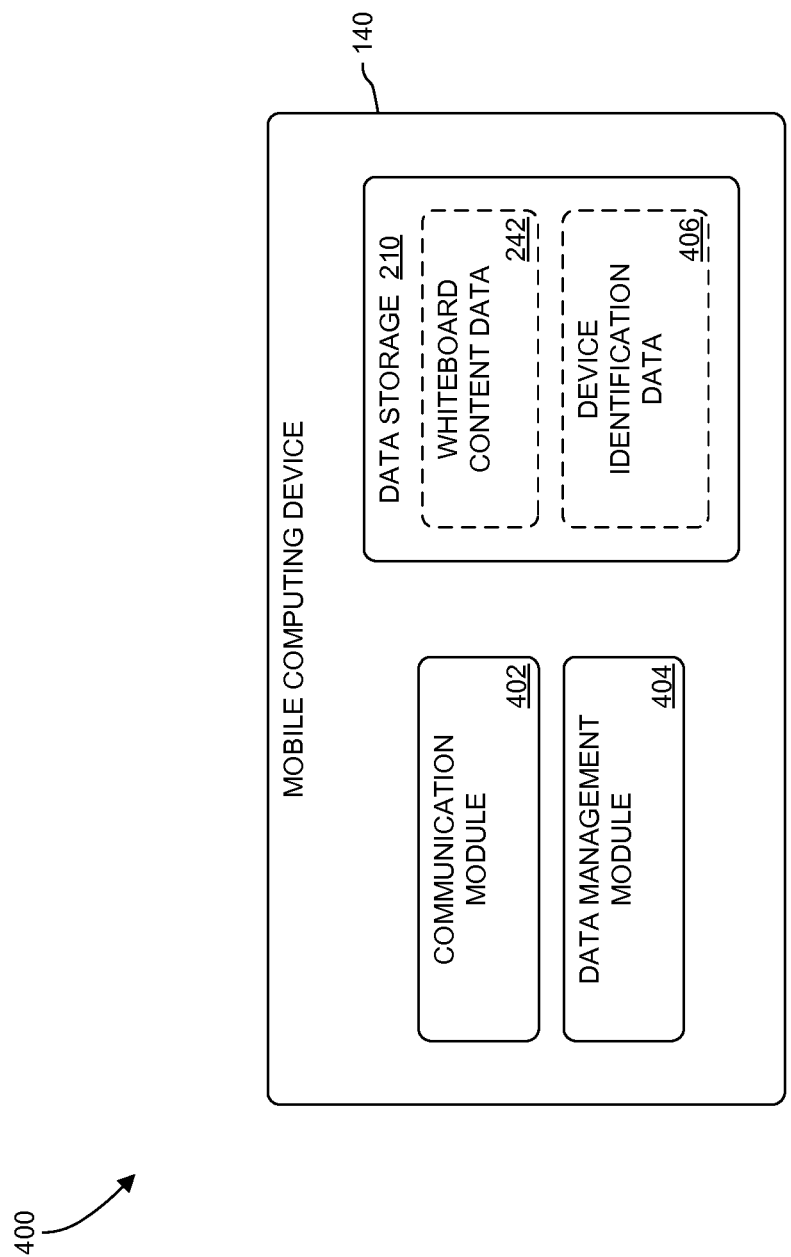
FIG. 4 is a simplified block diagram of at least one embodiment of an environment of the mobile computing device of the system of FIGS. 1 and 2.

Referring now to FIG. 4, in one embodiment, the mobile computing device 140 establishes an environment 400 during operation. The illustrative environment 400 includes a communication module 402, a data management module 404, and the data storage 210, each of which may be embodied as software, firmware, hardware, or a combination thereof. It should be appreciated that the mobile computing device 140 may include other components, sub-components, modules, and devices commonly found in a mobile computing device, which are not illustrated in FIG. 4 for clarity of the description.

The communication module 402 of the mobile computing device 140 facilitates communications with one or more of the smart whiteboard devices 130. As discussed, the mobile computing device 140 may be used as an intermediary for transferring whiteboard content data 242 between the smart whiteboard devices 130. For example, the mobile computing device 140 may facilitate the transfer of whiteboard content data 242 from one of the smart whiteboard devices 130 (e.g., the smart whiteboard device 132) to another one of the smart whiteboard devices 130 (e.g., the smart whiteboard device 134). In such embodiments, the communication module 402 may initially establish a wireless communication channel 150 with one of the smart whiteboard devices 130 (e.g., the smart whiteboard device 132) using short-range communications such as, for example, near field communications. The communication module 402 and the smart whiteboard device 132 may then establish another communication channel 152 (e.g., Wi-Fi®, Bluetooth®, WiMAX, Ethernet, etc.) over which the communication module 402 may receive whiteboard content data 242 from the smart whiteboard device 132. Thereafter, the communication module 402 may establish a different wireless communication channel 154 with another one of the smart whiteboard devices 130 (e.g., the smart whiteboard device 134) using short-range communications such as, for example, near field communications. The different wireless communication channel 154 may be used to establish yet another communication channel 156 (e.g., Wi-Fi®, Bluetooth®, WiMAX, Ethernet, etc.) between the mobile computing device 140 and the another smart whiteboard device 134. After doing so, the communication module 402 may transmit the whiteboard content data 242 to the other smart whiteboard device 134 using the other communication channel 156. Upon receipt of the whiteboard content data 242, the other the smart whiteboard device 134 may display a visual representation of the whiteboard content data 242 on the display 250 for viewing and manipulation by the user.

The data management module 404 of the mobile computing device 140 facilitates the processing of whiteboard content data 242 received from and/or to be transferred to one or more of the smart whiteboard devices 130. In embodiments, wherein a separate communication channel (e.g., the communication channel 152, 156) is established between the mobile computing device 140 and one or more of the smart whiteboard devices 130, the data management module 404 may facilitate storing and retrieving whiteboard content data from the data storage 210.

In some embodiments, the mobile computing device 140 may read or otherwise capture an NFC tag generated and made available by another one of the smart whiteboard devices 130 (e.g., the smart whiteboard device 134). The NFC tag read from the other smart whiteboard device 134 may include a URL and/or a network address of a web server executing on the smart whiteboard device 132 from which the whiteboard content data 242 may be directly retrieved (e.g., downloaded, accessed, obtained, etc.). The data management module 404 may store the captured NFC tag in the data storage 210. In some embodiments, the data management module 404 may decode the NFC tag and store the contents (e.g., the URL and/or network address) in the data storage 210. To facilitate transfer of the whiteboard content data 242 between the smart whiteboard devices 130 (e.g., from the smart whiteboard device 132 to the smart whiteboard device 134), the data management module 404 may retrieve the NFC tag from the data storage 210 and make the retrieved NFC tag available via the NFC circuitry 216 of the mobile computing device 140. In embodiments wherein the data management decodes the NFC tag and stores the contents (e.g., the URL and/or network address) in the data storage 210, the data management module 404 may be configured to retrieve and re-encode the decoded contents (e.g., the URL and/or network address) as another NFC tag, which may be read and decoded by the NFC circuitry 246 of the other smart whiteboard device 134.

Additionally or alternatively, the data management module 404, in some embodiments, may also be configured to capture, with the camera 218, a QR code displayed by one of the smart whiteboard devices 130 (e.g., the smart whiteboard device 132). The captured QR code may include the URL and/or the network address of the web server executing on the smart whiteboard device 132 from which the whiteboard content data 242 may be directly retrieved (e.g., downloaded, accessed, obtained, etc.). The data management module 404 may store the captured QR code in the data storage 210. In some embodiments, the data management module 404 may decode the captured QR code and store the contents (e.g., the URL and/or network address) in the data storage 210. To facilitate transfer of the whiteboard content data 242 between the smart whiteboard devices 130 (e.g., from the smart whiteboard device 132 to the smart whiteboard device 134), the data management module 404 may retrieve the QR code from the data storage 210 and display the retrieved QR code on the display 220 of the mobile computing device 140. In embodiments wherein the data management decodes the captured QR code and stores the contents (e.g., the URL and/or network address) in the data storage 210, the data management module 404 may be configured to retrieve and re-encode the decoded contents (e.g., the URL and/or network address) as another QR code, which may be captured and decoded by another one of the smart whiteboard devices 130 (e.g., the smart whiteboard device 134).

As discussed, in some embodiments, the mobile computing device 140 may also read an NFC tag generated by another one of the smart whiteboard devices 130 (e.g., the smart whiteboard device 134) that includes the whiteboard content data 242. In such embodiments, the data management module 404 may store the NFC tag in the data storage 210. The data management module 404 may also be configured to process (e.g., decode, convert, etc.) the NFC tag and store the decoded whiteboard content data 242 in the data storage 210. To facilitate transferring the received whiteboard content data 242 to another one of the smart whiteboard devices 130 (e.g., the smart whiteboard device 134), the data management module 404 may prepare the received whiteboard content data 242 prior to transfer. To do so, the data management module 404 may, in some embodiments, be configured to retrieve the NFC tag from the data storage 210 and make it available to be read by the NFC circuitry 246 of the other smart whiteboard device 134. In embodiments wherein the data management module 404 processes the NFC tag to obtain the whiteboard content data 242, the data management module 404 may be configured to retrieve the whiteboard content data 242 from the data storage 210 and convert (e.g., re-encode) the whiteboard content data 242 into another NFC tag, which may be read by the NFC circuitry 246 of the other smart whiteboard device 134. It should be understood that the NFC tags generated and/or made available by the data management module 404 may embodied as either physical NFC tags or "soft" NFC tags on the mobile computing device 140.

In some embodiments, the data management module 404 of the mobile computing device 140 facilitates transferring the whiteboard content data 242 received from one or more of the smart whiteboard devices 130 to a remote computing device for archival purposes. In such embodiments, the whiteboard content data 242 received by the data management module 404 may be archived on the remote computing device based at least in part on, or otherwise as a function of, a user policy or preference corresponding to the user. The archived whiteboard content data 242 may be later retrieved, in some embodiments, by the user via one or more computing devices such as, for example, the mobile computing device 140 and/or one or more of the smart whiteboard devices 130.

The data management module 404 of the mobile computing device 140 facilitates the processing of whiteboard content data 242 received from and/or to be transferred to one or more of the smart whiteboard devices 130.

The data storage 210 maintains whiteboard content data 242 received from one or more of the smart whiteboard devices 130. The whiteboard content data 242 may embody a digitized representation of content (e.g., the digitized content 160) generated by the user and displayed on one of the smart whiteboard devices 130 (e.g., the smart whiteboard device 132). In some embodiments, the whiteboard content data 242 may be embodied as static digital images, vector graphics, video, text, and/or other multi-media data representative of the content which was generated by the user and displayed on the display 250 of one of the smart whiteboard devices 130. In some embodiments, the data storage 210 of the mobile computing device 140 may also store device identification data 406. The device identification data 406 may be used to facilitate authenticating the mobile computing device 140 with one or more of the smart whiteboard devices 130. In such embodiments, the device identification data 406 may be embodied as a number, alphanumeric string of characters, a word, or any other appropriate data that uniquely identifies the mobile computing device 140 from one or more other computing devices. For example, in some embodiments, the unique device identification data 406 may comprise a unique serial number associated with the mobile computing device 140. In embodiments wherein the data storage 210 includes the device identification data 406, the data management module 404 may provide the device identification data 406 to one or more of the smart whiteboard devices 130 to facilitate authentication of the mobile computing device 140

Figure 5:
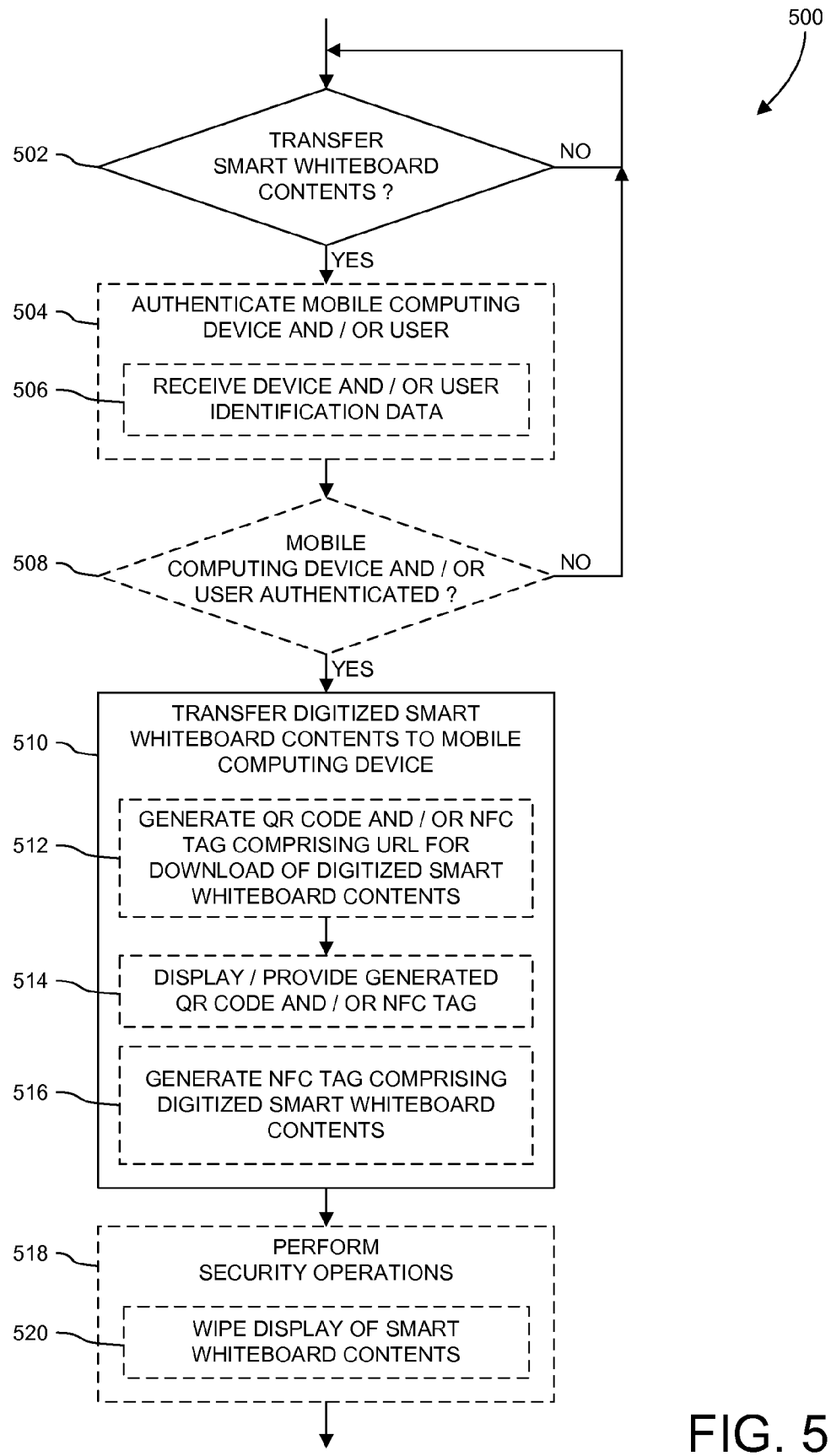
FIG. 5 is a simplified flow diagram of at least one embodiment of a method that may be executed by one of the smart whiteboard devices of FIGS. 1-3 for transferring whiteboard content data to another one of the smart whiteboard devices.

Referring now to FIG. 5, in use, one of the smart whiteboard devices 130 (e.g., the smart whiteboard device 132) may execute a method 500 for transferring whiteboard content data 242 to another one of the smart whiteboard devices 130 (e.g., the smart whiteboard device 134) using the mobile computing device 140 as an intermediary device. The method 500 begins with block 502 in which the smart whiteboard device 132 determines whether to transfer whiteboard content data 242 to the other smart whiteboard device 134. For example, the smart whiteboard device 132 may determine to transfer the whiteboard content data 242 to the other smart whiteboard device 134 in response to detecting the mobile computing device 140 being placed in close proximity to the smart whiteboard device 132. In some embodiments, the smart whiteboard device 132 may detect that the mobile computing device 140 is in close proximity to the smart whiteboard device 132 in response to determining that the smart whiteboard device 132 is connected to, or is capable of connecting to, the mobile computing device 140 using short-range wireless communication exchanges 150, such as, for example, NFC communication exchanges. Additionally or alternatively, the smart whiteboard device 132 may determine to transfer the whiteboard content data 242 to the other smart whiteboard device 134 in response to a user's request to transfer the whiteboard content data 242, in response to a request received from an application executing on the smart whiteboard device 132 and/or the mobile computing device 140, or in response to some other criteria. If the smart whiteboard device 132 determines that the whiteboard content data 242 should not be transferred to the other smart whiteboard device 134, the method 500 returns to block 502. If, however, the smart whiteboard device 132 determines that the whiteboard content data 242 should be transferred to the other smart whiteboard device 134, the method 500 advances to block 510 in which the whiteboard content data 242 is transferred to the mobile computing device 140.

In some embodiments, the smart whiteboard device 132, at block 504, first authenticates the mobile computing device 140 and/or the user before the method 500 advances to block 510. To do so, the smart whiteboard device 132 receives device identification data 406 from the mobile computing device 140 at block 506. In some embodiments, the smart whiteboard device 132 may, additionally or alternatively, receive user identification data from the mobile computing device at block 506. The device identification data 406 and/or user identification data uniquely identifies the mobile computing device 140 and/or the user from other computing devices and/or users. At block 508, the smart whiteboard device 132 determines whether the mobile computing device 140 and/or the user should be authenticated. In some embodiments, the smart whiteboard device 132 determines whether to authenticate the mobile computing device 140 and/or the user as a function of the received device identification data 406 or the received user identification data that uniquely identifies the mobile computing device 140 and/or the user. To do so, in some embodiments, the smart whiteboard device 132 may compare the received device identification data 406 and/or the received user identification data against a list of trusted computing devices and/or users. It should be understood that in such embodiments the smart whiteboard device 132 may, additionally or alternatively, compare the received device identification data 406 and/or user identification data with a corresponding set of identification data previously stored on the smart whiteboard device 132. The smart whiteboard device 132 may also determine whether to authenticate the mobile computing device 140 and/or the user in response to receiving one or more communications from a remote computing device (e.g., a remote authentication server), or in response to some other criteria. If the smart whiteboard device 132 authenticates the mobile computing device 140 and/or the user, the method 500 advances to block 510. If, however, the smart whiteboard device 132 does not authenticate the mobile computing device 140 and/or the user, the method 500 returns to block 502.

At block 510, the smart whiteboard device 132 transfers the whiteboard content data 242 to the mobile computing device 140. As discussed, in some embodiments, the smart whiteboard device 132 and the mobile computing device 140 may initially establish a communication channel 150 using short-range wireless communications such as, for example, near field communications. After establishing the wireless communication channel 150, the smart whiteboard device 132 and the mobile computing device 140 may establish another communication channel 152 (e.g., Ethernet, Wi-Fi®, WiMAX, Bluetooth®, etc.) over which the smart whiteboard device 132 may transfer the whiteboard content data 242 to the mobile computing device 140, which may subsequently transfer the received whiteboard content data 242 to other smart whiteboard device 134.

Additionally or alternatively, in some embodiments, the smart whiteboard device 132 may encode or otherwise convert a uniform resource locator (URL) or a network address (e.g., an IP address) to generate a Quick Response (QR) code and/or an near field communication (NFC) tag at block 512. The URL or network address included in the generated QR code or NFC tag may correspond to a web server executing on the smart whiteboard device 132 from which the whiteboard content data 242 may be directly retrieved. In such embodiments, the smart whiteboard device 132 may display, at block 514, the generated QR code on the display 250 of the smart whiteboard device 132. The displayed QR code may be captured by the mobile computing device 140 and subsequently transferred to the other smart whiteboard device 134. It should be appreciated that in embodiments wherein the smart whiteboard device 132 generates an NFC tag, the generated NFC tag may be made available, at block 514, to be read by the mobile computing device 140 using the NFC circuitry 246 of the smart whiteboard device 132.

As discussed, in some embodiments, the smart whiteboard device 132 may encode or otherwise generate, at block 516, the whiteboard content data 242 into an NFC tag. In such embodiments, the NFC tag generated by the smart whiteboard device 132 may be embodied as a physical NFC tag or a "soft" NFC tag on the smart whiteboard device 132 that may be read by the NFC circuitry 216 of the mobile computing device 140. It should also be understood that in some embodiments, the smart whiteboard device 132 may, additionally or alternatively, transfer the whiteboard content data 242 directly to the user. For example, the smart whiteboard device 132 may send an e-mail including the whiteboard content data 242 directly to the user in response to successfully authenticating the user. In such embodiments, the smart whiteboard device 132 may send the e-mail message in response to the user scanning an identification badge with a scanner embedded within or communicatively coupled to the smart whiteboard device 132.

In some embodiments, after transferring the whiteboard content data 242 to the mobile computing device 140, the smart whiteboard device 132 may perform one or more security operations at block 518. For example, at block 520, the smart whiteboard device 132 may wipe (e.g., clear, gray-out, cover, scramble, etc.) the whiteboard content data 242 being displayed on the display 250 in response to transferring the whiteboard content data 242 to the mobile computing device 140. It should be appreciated that the smart whiteboard device 132 may perform various other security operations in response to transferring the whiteboard content data 242 to the mobile computing device 140.

Figure 6:
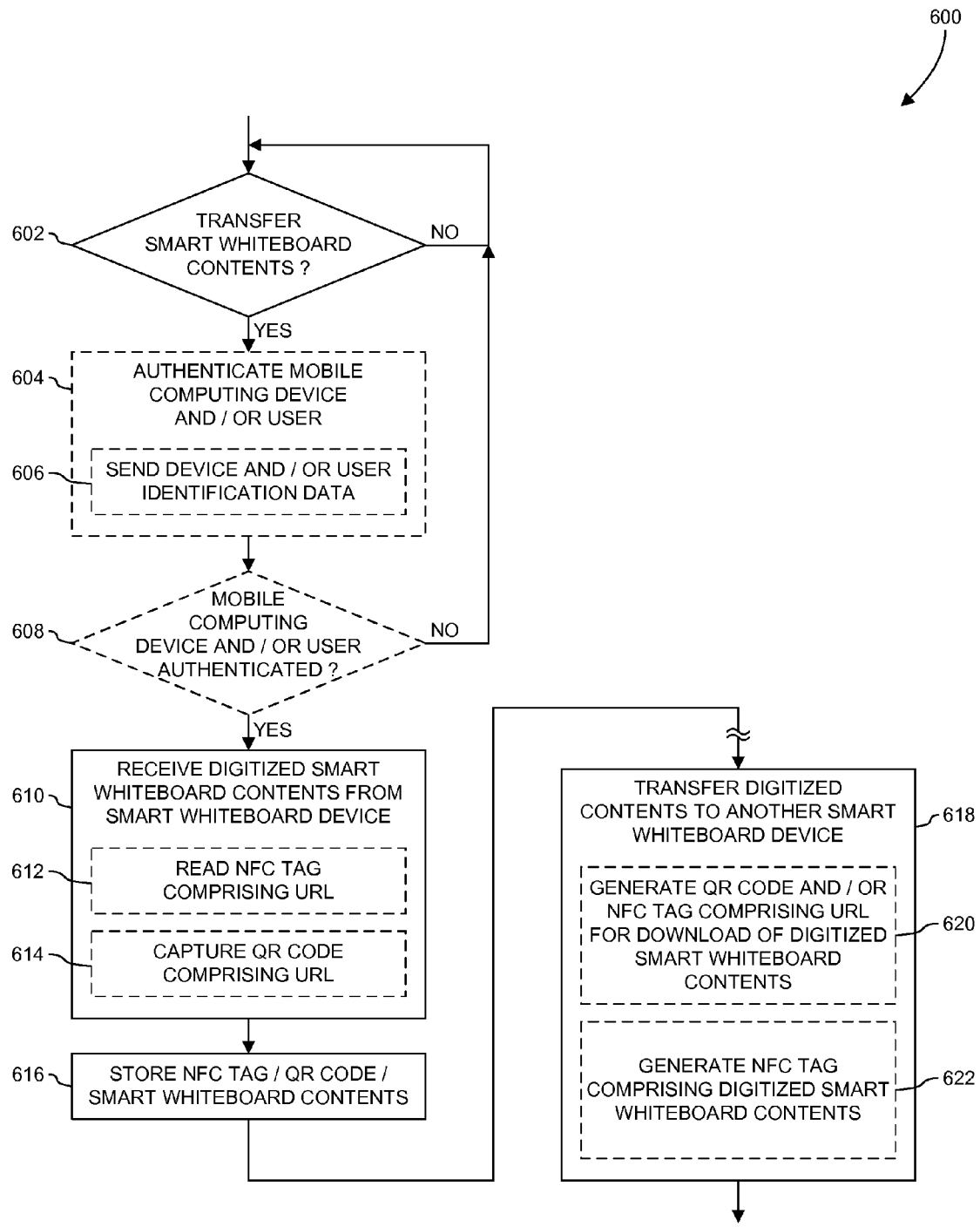
FIG. 6 is a simplified flow diagram of at least one embodiment of a method that may be executed by the mobile computing device of FIG. 4 for receiving whiteboard content data from one of the smart whiteboard devices of FIGS. 1-3 to another one of the smart whiteboard devices.

Referring now to FIG. 6, in use, the mobile computing device 140 may execute a method 600 for receiving whiteboard content data 242 from one of the smart whiteboard devices 130 (e.g., the smart whiteboard device 132) and transferring the received whiteboard content data 242 to another one of the smart whiteboard devices 130 (e.g., the smart whiteboard device 134). The method 600 begins with block 602 in which the mobile computing device 140 determines whether whiteboard content data 242 should be transferred from the smart whiteboard device 132 to the other smart whiteboard device 134 using the mobile computing device 140 as an intermediary device (e.g., a proxy transfer device). For example, the mobile computing device 140 may determine that the whiteboard content data 242 should be transferred from the smart whiteboard device 132 to the smart whiteboard device 134 in response to detecting that the mobile computing device 140 is placed in close proximity to the smart whiteboard device 132. In some embodiments, the mobile computing device 140 may detect that the smart whiteboard device 132 is in close proximity to the mobile computing device 140 in response to determining that the mobile computing device is connected to, or is capable of connecting to, the smart whiteboard device 132 using short-range wireless communication exchanges 150, such as, for example, NFC communication exchanges. Additionally or alternatively, the mobile computing device 140 may determine that the whiteboard content data 242 should be transferred from the smart whiteboard device 132 to the other smart whiteboard device 134 in response to a user's request to transfer the whiteboard content data 242, in response to a request received from an application executing on the mobile computing device 140 and/or one or more of the smart whiteboard devices 132, 134, or in response to some other criteria. If the mobile computing device 140 determines that the whiteboard content data 242 should not be transferred from the smart whiteboard device 132 to the other smart whiteboard device 134, the method 600 returns to block 602. If, however, the mobile computing device 140 determines that the whiteboard content data 242 should be transferred from the smart whiteboard device 132 to the other smart whiteboard device 134, the method 600 advances to block 610 in which the whiteboard content data 242 is received from the smart whiteboard device 132.

In some embodiments, the mobile computing device 140 and/or the user, at block 604, must first authenticate to the smart whiteboard device 132 before the method 600 advances to block 610. To do so, the mobile computing device 140, may send device identification data 406 and, additionally or alternatively, user identification data to the smart whiteboard device 132 at block 606. The device identification data 406 uniquely identifies the mobile computing device 140 from other computing devices and the user identification data uniquely identifies the user from other users. If, at block 608, the mobile computing device 140 and/or the user successfully authenticates with the smart whiteboard device 132, the method 600 advances to block 610. If, however, the mobile computing device 140 and/or the user does not successfully authenticate with the smart whiteboard device 132, the method 600 returns to block 602.

At block 610, the mobile computing device 140 receives the whiteboard content data 242 from the smart whiteboard device 132. As discussed, in some embodiments, the mobile computing device 140 and the smart whiteboard device 132 may initially establish a communication channel 150 using short-range wireless communications such as, for example, near field communications. After establishing the wireless communication channel 150, the mobile computing device 140 and the smart whiteboard device 132 and may establish another communication channel 152 (e.g., Ethernet, Wi-Fi®, WiMAX, Bluetooth®, etc.) over which the mobile computing device 140 may receive the whiteboard content data 242 from the smart whiteboard device 132.

In some embodiments, at block 612, the mobile computing device 140 may read an NFC tag provided by or otherwise made available by the NFC circuitry 246 of the smart whiteboard device 132. Additionally or alternatively, at block 614, the mobile computing device 140 may capture a QR code being displayed by the smart whiteboard device 132, in some embodiments. The NFC tag being made available by the NFC circuitry 246 of the smart whiteboard device 132, or the QR code being displayed by display 250 of the smart whiteboard device 132 may include a URL or a network address encoded therein. The URL or network address included in the displayed QR code and/or the generated NFC tag may correspond to a web server 308 executing on the smart whiteboard device 132 from which the whiteboard content data 242 may be directly retrieved. In some embodiments, the mobile computing device 140 may also process (e.g., decode, convert, etc.) the QR code and/or NFC tag to obtain the URL and/or network address encoded therein.

As discussed, in some embodiments, the mobile computing device 140 may also read an NFC tag on the smart whiteboard device 132 that includes the whiteboard content data 242 encoded therein. In such embodiments, the mobile computing device 140 may process (e.g., decode, convert, etc.) the NFC tag to obtain the whiteboard content data 242 encoded therein.

After receiving the whiteboard content data 242 from the smart whiteboard device 132 (e.g., receiving the whiteboard content data via the communication channel 152, reading the NFC tag, capturing the QR code from the smart whiteboard device 132, etc.), the method 600 then advances to block 616 in which the mobile computing device 140 stores the received whiteboard content data 242, the received NFC tag, the decoded whiteboard content data 242, the QR code, and/or the decoded URL or network address in the data storage 210. The method 600 then advances to block 618.

At block 618, the mobile computing device 140 may transfer the received whiteboard content data 242 to the another smart whiteboard device 134. As discussed, in some embodiments, the mobile computing device 140 and the smart whiteboard device 134 and may initially establish a communication channel 154 using short-range wireless communications such as, for example, near field communications. After establishing the wireless communication channel 154, the mobile computing device 140 and the smart whiteboard device 134 may establish another communication channel 156 (e.g., Ethernet, Wi-Fi®, WiMAX, Bluetooth®, etc.) over which the mobile computing device 140 may transfer the whiteboard content data 242 to the smart whiteboard device 134.

At block 620, in embodiments wherein the mobile computing device 140 captures a QR code from the smart whiteboard device 132, the mobile computing device 140 may retrieve the QR code tag from the data storage 210 and subsequently display the retrieved QR code on the display 220 of the mobile computing device 140. Additionally or alternatively, in embodiments wherein mobile computing device 140 decodes the QR code to obtain the URL and/or network address of the web server, the mobile computing device 140 may, at block 620, retrieve the decoded URL and/or network address from the data storage 210 and re-encode the retrieved URL and/or network address into another QR code, which may be subsequently displayed on the display 220 of the mobile computing device 140. It should be appreciated that in embodiments wherein the mobile computing device 140 reads an NFC tag from the smart whiteboard device 132, the mobile computing device 140 may retrieve NFC tag from the data storage 210 and subsequently make the retrieved NFC tag available via the NFC circuitry 216 of the mobile computing device 140. Additionally or alternatively, in embodiments wherein mobile computing device 140 decodes the NFC tag to obtain the URL and/or network address of the web server, the mobile computing device 140 may, at block 620, retrieve the decoded URL and/or network address from the data storage 210 and re-encode the retrieved URL and/or network address into another NFC, which may be subsequently made available via the NFC circuitry 216 of the mobile computing device 140.

As discussed, in some embodiments, the mobile computing device 140 may retrieve the NFC tag from the data storage 210 and make it available to be read by the NFC circuitry 246 of the other smart whiteboard device 134 at block 622. In embodiments wherein mobile computing device 140 processes the NFC tag to obtain the whiteboard content data 242, the mobile computing device 140 may retrieve the whiteboard content data 242 from the data storage 210 and, at block 622, convert the whiteboard content data 242 into another NFC tag, which may be read by the NFC circuitry 246 of the other smart whiteboard device 134. The NFC tags generated and/or provided (e.g., made available) by the mobile computing device 140 may embodied as either physical NFC tags or "soft" NFC tags on the mobile computing device 140.

Figure 7:
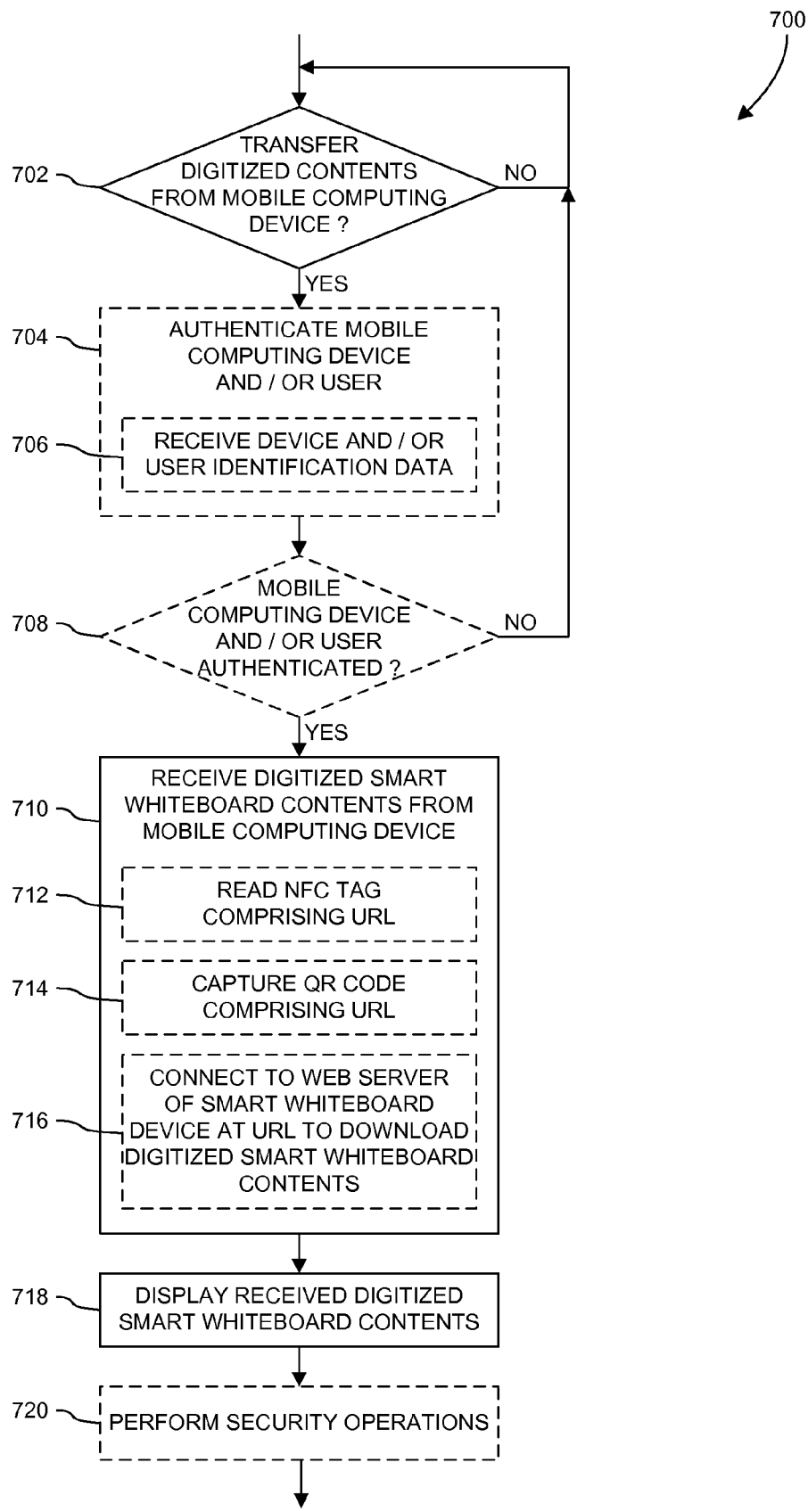
FIG. 7 is a simplified flow diagram of at least one embodiment of a method that may be executed by one of the smart whiteboard devices of FIGS. 1-3 for receiving whiteboard content data transferred from another one of the smart whiteboard devices.

Referring now to FIG. 7, in use, one of the smart whiteboard devices 130 (e.g., the smart whiteboard device 134) may execute a method 700 for receiving whiteboard content data 242 transferred from another one of the smart whiteboard devices 130 (e.g., the smart whiteboard device 132) using the mobile computing device 140 as an intermediary transfer device. The method 700 begins with block 702 in which the smart whiteboard device 134 determines whether whiteboard content data 242 is to be transferred from the other smart whiteboard device 132. For example, the smart whiteboard device 134 may determine that whiteboard content data 242 is to be transferred from the other smart whiteboard device 132 in response to detecting the mobile computing device 140 being placed in close proximity to the smart whiteboard device 134. In some embodiments, the smart whiteboard device 134 may detect that the mobile computing device 140 is in close proximity to the smart whiteboard device 134 in response to determining that the smart whiteboard device 134 is connected to, or is capable of connecting to, the mobile computing device 140 using short-range wireless communication exchanges 154, such as, for example, NFC communication exchanges. Additionally or alternatively, the smart whiteboard device 134 may determine that the whiteboard content data 242 is to be transferred from the other smart whiteboard device 132 in response to a user's request to transfer the whiteboard content data 242, in response to a request received from an application executing on one or more of the smart whiteboard devices 132, 134 and/or the mobile computing device 140, or in response to some other criteria. If the smart whiteboard device 134 determines that the whiteboard content data 242 is not to be transferred from the other smart whiteboard device 132, the method 700 returns to block 702. If, however, the smart whiteboard device 134 determines that the whiteboard content data 242 is be transferred from the other smart whiteboard device 132, the method 700 advances to block 710 in which the whiteboard content data 242 to be transferred is received from the mobile computing device 140.

In some embodiments, the smart whiteboard device 134, at block 704, first authenticates the mobile computing device 140 and/or the user before the method 700 advances to block 710. To do so, the smart whiteboard device 134 receives device identification data 406 from the mobile computing device 140 at block 706. In some embodiments, the smart whiteboard device 134 may, additionally or alternatively, receive user identification data from the mobile computing device at block 706. The device identification data 406 and/or user identification data uniquely identifies the mobile computing device 140 and/or the user from other computing devices and/or users. At block 708, the smart whiteboard device 134 determines whether the mobile computing device 140 and/or the user should be authenticated. In some embodiments, the smart whiteboard device 134 determines whether to authenticate the mobile computing device 140 and/or the user as a function of the received device identification data 406 or the received user identification data that uniquely identifies the mobile computing device 140 and/or the user. To do so, in some embodiments, the smart whiteboard device 134 may compare the received device identification data 406 and/or the received user identification data against a list of trusted computing devices and/or users. It should be understood that in such embodiments, the smart whiteboard device 134 may, additionally or alternatively, compare the received device identification data 406 and/or user identification data with a corresponding set of identification data previously stored on the smart whiteboard device 134. The smart whiteboard device 134 may also determine whether to authenticate the mobile computing device 140 and/or the user in response to receiving one or more communications from a remote computing device (e.g., a remote authentication server), or in response to some other criteria. If the smart whiteboard device 134 authenticates the mobile computing device 140 and/or the user, the method 700 advances to block 710. If, however, the smart whiteboard device 134 does not authenticate the mobile computing device 140 and/or the user, the method 700 returns to block 702.

At block 710, the smart whiteboard device 134 receives the whiteboard content data 242 to be transferred from the mobile computing device 140. As discussed, in some embodiments, the smart whiteboard device 134 and the mobile computing device 140 may initially establish a communication channel 154 using short-range wireless communications such as, for example, near field communications. After establishing the wireless communication channel 154, the smart whiteboard device 134 and the mobile computing device 140 may establish another communication channel 156 (e.g., Ethernet, Wi-Fi®, WiMAX, Bluetooth®, etc.) over which the mobile computing device 140 may transfer the whiteboard content data 242 to the smart whiteboard device 134.

In some embodiments, at block 712, the smart whiteboard device 134 may read or otherwise capture an NFC tag generated and made available by the mobile computing device 140. Additionally or alternatively, at block 714, the smart whiteboard device 134 may capture a QR code being displayed by the mobile computing device 140. The NFC tag and/or QR code captured/read from the mobile computing device 140 may include a URL or a network address encoded therein. The URL or network address included in the captured/read NFC tag and/or QR code may correspond to a web server 308 executing on the other smart whiteboard device 132 and from which the whiteboard content data 242 may be directly retrieved. In some embodiments, the smart whiteboard device 134 may also process (e.g., decode, convert, etc.) the QR code and/or NFC tag to obtain the URL and/or network address encoded therein. After decoding the QR and/or NFC tag, the smart whiteboard device 134 may utilize the obtained URL and/or network address to connect to the web server module 308 executing on the other smart whiteboard device 132 at block 716. In doing so, the smart whiteboard device 134 may directly retrieve the whiteboard content data 242 from the other smart whiteboard device 132.

As discussed, in some embodiments, the smart whiteboard device 134 may also read an NFC tag from the mobile computing device 140 that includes the whiteboard content data 242 encoded therein. In such embodiments, the smart whiteboard device 134 may process (e.g., decode, convert, etc.) the NFC tag to obtain the whiteboard content data 242 encoded therein.

After obtaining the whiteboard content data 242 transferred from the other smart whiteboard device 132, the method 700 advances to block 718 in which the smart whiteboard device 134 displays the transferred whiteboard content data 242 on the display 250 of the smart whiteboard device 134. In that way, whiteboard content data 242 may be securely transferred from one of the smart whiteboard devices 130 (e.g., the smart whiteboard device 132) to another one of the smart whiteboard devices 130 (e.g., the smart whiteboard device 134).

Additionally, it should be appreciated that although the smart whiteboard device 134 receives and displays whiteboard content data 242 generated by the smart whiteboard device 132 in the illustrative embodiment, the smart whiteboard device 134 may receive and display whiteboard content data generated by more than one smart whiteboard device. For example, in some embodiments, the smart whiteboard device 134 may receive whiteboard content data 242 generated by the smart whiteboard device 132 and another smart whiteboard device (not shown). In such embodiments, the whiteboard content data 242 received from the smart whiteboard device 132 and the other smart whiteboard device may be displayed by the smart whiteboard device 134 in different area of the display 250 based at least in part on a user policy and/or preference. Additionally or alternatively, the smart whiteboard device 134 may display the whiteboard content data 242 received from the smart whiteboard device 132 and the other smart whiteboard device in a side-by-side manner, on top of each other if transparency is enabled, and/or display the whiteboard content data 242 from different devices in any suitable manner (e.g., grid layout, zoom layout, ordered layout, etc.) In that way, the user may define the location and the manner in which each piece of whiteboard content data 242 should be displayed based on the source.

In some embodiments, after receiving the whiteboard content data 242 from the mobile computing device 140 and/or the other smart whiteboard device 132, the smart whiteboard device 134 may perform one or more security operations at block 720. For example, the smart whiteboard device 134 may wipe (e.g., clear, gray-out, cover, scramble, etc.) the transferred whiteboard content data 242 being displayed on the display 250 in response to detecting that the mobile computing device 140 is no longer located in proximity the smart whiteboard device 134. In that way, the smart whiteboard device 134 may facilitate preventing confidential information from being accessed and/or viewed by unauthorized individuals.

EXAMPLES

Illustrative examples of the devices, systems, and methods disclosed herein are provided below. An embodiment of the devices, systems, and methods may include any one or more, and any combination of, the examples described below.

Example 1 includes a mobile device to transfer whiteboard content between smart whiteboard devices. The mobile device includes a display; a communication module to (i) receive whiteboard content data from a first whiteboard device with a first communication data exchange via a first communication channel (ii) transmit the received whiteboard content data to a second whiteboard device with a second communication data exchange via a second communication channel; a data storage to store the whiteboard content data received from the first whiteboard device; and a data management module to (i) process the whiteboard content data received from the first whiteboard device and (ii) prepare the received whiteboard content data for transfer to the second whiteboard device.

Example 2 includes the subject matter of Example 1, and wherein the first communication channel is initially established with first a near-field communication exchange; and wherein the second communication channel is initially established with a second near-field communication exchange.

Example 3 includes the subject matter of any of Examples 1 and 2, and wherein to receive whiteboard content data from a first whiteboard device with a first communication data exchange comprises to capture a Quick Response code displayed by the first whiteboard device, the Quick Response code comprises at least one of a uniform resource locator or a network address of the first whiteboard device from which the second smart whiteboard device can retrieve the whiteboard content data; and wherein to process the whiteboard content data received from the first whiteboard device comprises to (i) decode the Quick Response code captured from the first whiteboard device to obtain the at least one of the uniform resource locator or the network address of the first whiteboard device and (ii) store the at least one of the uniform resource locator or the network address of the first whiteboard device in the data storage.

Example 4 includes the subject matter of any of Examples 1-3, and wherein to prepare the received whiteboard content data for transfer to the second whiteboard device comprises to (i) retrieve the at least one of the uniform resource locator or the network address of the first whiteboard device from the data storage and (ii) re-encode the at least one of the retrieved uniform resource locator or the retrieved network address of the first whiteboard device into another Quick Response code; and wherein to transmit the received whiteboard content data to a second whiteboard device with a second communication data exchange comprises to display the another Quick Response code on the display for capture by the second whiteboard device.

Example 5 includes the subject matter of any of Examples 1-4, and wherein to receive whiteboard content data from a first whiteboard device with a first communication data exchange comprises to capture a Quick Response code displayed by the first whiteboard device, the Quick Response code comprises at least one of a uniform resource locator or a network address of the first whiteboard device from which the second smart whiteboard device can retrieve the whiteboard content data; wherein to process the whiteboard content data received from the first whiteboard device comprises to store the Quick Response code captured from the first whiteboard device in the data storage; wherein to prepare the received whiteboard content data for transfer to the second whiteboard device comprises to retrieve the Quick Response code from the data storage; and wherein to transmit the received whiteboard content data to a second whiteboard device comprises to display the retrieved Quick Response code on the display to be captured by the second whiteboard device.

Example 6 includes the subject matter of any of Examples 1-5, and wherein to receive whiteboard content data from a first whiteboard device with a first communication data exchange comprises to read a near-field communication tag generated by the first whiteboard device, the near-field communication tag comprises at least one of a uniform resource locator or a network address of the first whiteboard device from which the second smart whiteboard device can retrieve the whiteboard content data; and wherein to process the whiteboard content data received from the first whiteboard device comprises to (i) decode the near-field communication tag read from the first whiteboard device to obtain the at least one of the uniform resource locator or the network address of the first whiteboard device and (ii) store the at least one of the uniform resource locator or the network address of the first whiteboard device in the data storage.

Example 7 includes the subject matter of any of Examples 1-6, and wherein to prepare the received whiteboard content data for transfer to the second whiteboard device comprises to (i) retrieve the at least one of the uniform resource locator or the network address of the first whiteboard device from the data storage and (ii) re-encode the at least one of the retrieved uniform resource locator or the retrieved network address of the first whiteboard device into another near-field communication tag; and wherein to transmit the received whiteboard content data to a second whiteboard device with a second communication data exchange to enable the another near-field communication tag to be read by the second whiteboard device.

Example 8 includes the subject matter of any of Examples 1-7, and wherein to receive whiteboard content data from a first whiteboard device with a first communication data exchange comprises to read a near-field communication tag generated by the first whiteboard device, the near-field communication tag comprises at least one of a uniform resource locator or a network address of the first whiteboard device from which the second smart whiteboard device can retrieve the whiteboard content data; wherein to process the whiteboard content data received from the first whiteboard device comprises to store the near-field communication tag read from the first whiteboard device in the data storage; wherein to prepare the received whiteboard content data for transfer to the second whiteboard device comprises to retrieve the near-field communication tag from the data storage; and wherein to transmit the received whiteboard content data to a second whiteboard device comprises to enable the retrieved near-field communication tag to be read by the second whiteboard device.

Example 9 includes the subject matter of any of Examples 1-8, and wherein the first and second communication data exchanges comprise a first Bluetooth communication data exchange and a second Bluetooth communication data exchange.

Example 10 includes the subject matter of any of Examples 1-9, and wherein to receive whiteboard content data from a first whiteboard device comprises to read a near-field communication tag generated by the first whiteboard device, the near-field communication tag comprises the whiteboard content data; and wherein to process the whiteboard content data received from the first whiteboard device comprises to (i) decode the near-field communication tag read from the first whiteboard device to obtain the whiteboard content data and (ii) store the obtained whiteboard content data in the data storage.

Example 11 includes the subject matter of any of Examples 1-10, and wherein to prepare the received whiteboard content data for transfer to the second whiteboard device comprises to (i) retrieve the whiteboard content data from the data storage and (ii) re-encode the retrieved whiteboard content data into another near-field communication tag; and wherein to transmit the received whiteboard content data to a second whiteboard device comprises to enable the another near-field communication tag to be read by the second whiteboard device.

Example 12 includes the subject matter of any of Examples 1-11, and wherein to receive whiteboard content data from a first whiteboard device comprises to read a near-field communication tag generated by the first whiteboard device, the near-field communication tag comprises the whiteboard content data; wherein to process the whiteboard content data received from the first whiteboard device comprises to store the near-field communication tag read from the first whiteboard device in the data storage; wherein to prepare the received whiteboard content data for transfer to the second whiteboard device comprises to retrieve the near-field communication tag from the data storage; and wherein to transmit the received whiteboard content data to a second whiteboard device comprises to enable the retrieved near-field communication tag to be read by the second whiteboard device.

Example 13 includes the subject matter of any of Examples 1-12, and wherein the data management module further to retrieve device identification data stored in the data storage in response to receiving a request from at least one of the first whiteboard device or the second whiteboard device to authenticate the mobile device, the device identification data uniquely identifies the mobile device from other computing devices; and wherein the communication module further to transmit the retrieved device identification data to the at least one of the first whiteboard device or the second whiteboard device.

Example 14 includes a method for transferring whiteboard content between smart whiteboard devices. The method includes receiving, on a mobile device, whiteboard content data from a first whiteboard device using a first communication data exchange via a first communication channel; processing, on the mobile device, the whiteboard content data received from the first whiteboard device; storing, on the mobile device, the whiteboard content data received from the first whiteboard device in a data storage of the mobile device; preparing, on the mobile device, the received whiteboard content data for transfer to a second whiteboard device; and transmitting, on the mobile device, the received whiteboard content data to the second whiteboard device using a second communication data exchange via a second communication channel.

Example 15 includes the subject matter of Example 14, and wherein the first communication channel being initially established using first a near-field communication exchange; and wherein the second communication channel being initially established using a second near-field communication exchange.

Example 16 includes the subject matter of any of Examples 14 and 15, and wherein receiving whiteboard content data from a first whiteboard device using a first communication data exchange comprises capturing a Quick Response code displayed by the first whiteboard device, the Quick Response code comprises at least one of a uniform resource locator or a network address of the first whiteboard device from which the second smart whiteboard device can retrieve the whiteboard content data; and wherein processing the whiteboard content data received from the first whiteboard device comprises (i) decoding the Quick Response code captured from the first whiteboard device to obtain the at least one of the uniform resource locator or the network address of the first whiteboard device and (ii) storing the at least one of the uniform resource locator or the network address of the first whiteboard device in the data storage.

Example 17 includes the subject matter of any of Examples 14-16, and wherein preparing the received whiteboard content data for transfer to the second whiteboard device comprises (i) retrieving the at least one of the uniform resource locator or the network address of the first whiteboard device from the data storage and (ii) re-encoding the at least one of the retrieved uniform resource locator or the retrieved network address of the first whiteboard device into another Quick Response code; and wherein transmitting the received whiteboard content data to a second whiteboard device using a second communication data exchange comprises displaying the another Quick Response code on a display for capture by the second whiteboard device.

Example 18 includes the subject matter of any of Examples 14-17, and wherein receiving whiteboard content data from a first whiteboard device using a first communication data exchange comprises capturing a Quick Response code displayed by the first whiteboard device, the Quick Response code comprises at least one of a uniform resource locator or a network address of the first whiteboard device from which the second smart whiteboard device can retrieve the whiteboard content data; wherein processing the whiteboard content data received from the first whiteboard device comprises storing the Quick Response code captured from the first whiteboard device in the data storage; wherein preparing the received whiteboard content data for transfer to the second whiteboard device comprises retrieving the Quick Response code from the data storage; and wherein transmitting the received whiteboard content data to a second whiteboard device comprises displaying the retrieved Quick Response code on a display for capture by the second whiteboard device.

Example 19 includes the subject matter of any of Examples 14-18, and wherein receiving whiteboard content data from a first whiteboard device using a first communication data exchange comprises reading a near-field communication tag generated by the first whiteboard device, the near-field communication tag comprises at least one of a uniform resource locator or a network address of the first whiteboard device from which the second smart whiteboard device can retrieve the whiteboard content data; and wherein processing the whiteboard content data received from the first whiteboard device comprises (i) decoding the near-field communication tag read from the first whiteboard device to obtain the at least one of the uniform resource locator or the network address of the first whiteboard device and (ii) storing the at least one of the uniform resource locator or the network address of the first whiteboard device in the data storage.

Example 20 includes the subject matter of any of Examples 14-19, and wherein preparing the received whiteboard content data for transfer to the second whiteboard device comprises (i) retrieving the at least one of the uniform resource locator or the network address of the first whiteboard device from the data storage and (ii) re-encoding the at least one of the retrieved uniform resource locator or the retrieved network address of the first whiteboard device into another near-field communication tag; and wherein transmitting the received whiteboard content data to a second whiteboard device using a second communication data exchange comprises enabling the another near-field communication tag to be read by the second whiteboard device.

Example 21 includes the subject matter of any of Examples 14-20, and wherein receiving whiteboard content data from a first whiteboard device using a first communication data exchange comprises reading a near-field communication tag generated by the first whiteboard device, the near-field communication tag comprises at least one of a uniform resource locator or a network address of the first whiteboard device from which the second smart whiteboard device can retrieve the whiteboard content data; wherein processing the whiteboard content data received from the first whiteboard device comprises storing the near-field communication tag read from the first whiteboard device in the data storage; wherein preparing the received whiteboard content data for transfer to the second whiteboard device comprises retrieving the near-field communication tag from the data storage; and wherein transmitting the received whiteboard content data to a second whiteboard device comprises enabling the retrieved near-field communication tag to be read by the second whiteboard device.

Example 22 includes the subject matter of any of Examples 14-21, and wherein the first and second communication data exchanges comprise a first Bluetooth communication data exchange and a second Bluetooth communication data exchange.

Example 23 includes the subject matter of any of Examples 14-22, and further including retrieving, on the mobile device, device identification data stored in the data storage in response to receiving a request from at least one of the first whiteboard device or the second whiteboard device to authenticate the mobile device, the device identification data uniquely identifies the mobile device from other computing devices; and transmitting, on the mobile device, the retrieved device identification data to the at least one of the first whiteboard device or the second whiteboard device.

Example 24 includes the subject matter of any of Examples 14-23, and wherein receiving whiteboard content data from a first whiteboard device comprises reading a near-field communication tag generated by the first whiteboard device, the near-field communication tag comprises the whiteboard content data; and wherein processing the whiteboard content data received from the first whiteboard device comprises (i) decoding the near-field communication tag read from the first whiteboard device to obtain the whiteboard content data and (ii) storing the whiteboard content data in the data storage.

Example 25 includes the subject matter of any of Examples 14-24, and wherein preparing the received whiteboard content data for transfer to the second whiteboard device comprises (i) retrieving the whiteboard content data from the data storage and (ii) re-encoding the retrieved whiteboard content data into another near-field communication tag; and wherein transmitting the received whiteboard content data to a second whiteboard device comprises enabling the another near-field communication tag to be read by the second whiteboard device.

Example 26 includes the subject matter of any of Examples 14-25, and wherein receiving whiteboard content data from a first whiteboard device comprises reading a near-field communication tag generated by the first whiteboard device, the near-field communication tag comprises the whiteboard content data; wherein processing the whiteboard content data received from the first whiteboard device comprises storing the near-field communication tag read from the first whiteboard device in the data storage; wherein preparing the received whiteboard content data for transfer to the second whiteboard device comprises retrieving the near-field communication tag from the data storage; and wherein transmitting the received whiteboard content data to a second whiteboard device comprises enabling the retrieved near-field communication tag to be read by the second whiteboard device.

Example 27 includes a mobile device to transfer whiteboard content between smart whiteboard devices. The mobile device includes a processor; and a memory having stored therein a plurality of instructions that when executed by the processor cause the mobile device to perform the method of any of Examples 14-26.

Example 28 includes one or more machine readable media including a plurality of instructions stored thereon that in response to being executed result in a mobile device performing the method of any of Examples 14-26.

Example 29 includes a smart whiteboard device to transfer whiteboard content to another smart whiteboard device. The smart whiteboard device includes a display to display whiteboard content data; a data storage to store the displayed whiteboard content data; a content management module to prepare the whiteboard content data for transfer to a mobile device; and a communication module to transmit the whiteboard content data to the mobile device for subsequent transfer to the another smart whiteboard device, the communication module to transmit the whiteboard content data to the mobile device with a communication data exchange via a communication channel.

Example 30 includes the subject matter of Example 29, and wherein the communication channel is initially established with a near-field communication exchange.

Example 31 includes the subject matter of any of Examples 29 and 30, and wherein to prepare the whiteboard content data for transfer to a mobile device comprises to generate a Quick Response code, the Quick Response code comprises at least one of a uniform resource locator or a network address of the smart whiteboard device from which the another smart whiteboard device can retrieve the whiteboard content data; and wherein to transmit the whiteboard content data to the mobile device with a communication data exchange comprises to display the generated Quick Response code for capture by the mobile device.

Example 32 includes the subject matter of any of Examples 29-31, and wherein to prepare the whiteboard content data for transfer to a mobile device comprises to generate a near-field communication tag, the near-field communication tag comprises at least one of a uniform resource locator or a network address of the smart whiteboard device from which the another smart whiteboard device can retrieve the whiteboard content data; and wherein to transmit the whiteboard content data to the mobile device with a communication data exchange comprises to enable the generated near-field communication tag to be read by the mobile device.

Example 33 includes the subject matter of any of Examples 29-32, and wherein to prepare the whiteboard content data for transfer to a mobile device comprises (i) to retrieve the whiteboard content data from the data storage and (ii) encode the whiteboard content data to generate a near-field communication tag; and wherein to transmit the whiteboard content data to the mobile device comprises to enable the near-field communication tag to be read by the mobile device.

Example 34 includes the subject matter of any of Examples 29-33, and wherein the communication data exchange comprises a Bluetooth communication data exchange.

Example 35 includes the subject matter of any of Examples 29-34, and further including a web server module, the web server module to enable the another smart whiteboard device to directly retrieve the whiteboard content data.

Example 36 includes the subject matter of any of Examples 29-35, and further including a web server module, the web server module to send an electronic mail message to an electronic mail address of a user in response to authentication of the user by the smart whiteboard device via a user identification badge.

Example 37 includes the subject matter of any of Examples 29-36, and further including a policy management module to enforce one or more policies, the one or more policies include one or more rules for transfer of the whiteboard content data to the mobile device.

Example 38 includes the subject matter of any of Examples 29-37, and wherein the one or more policies include a rule to require the mobile device to be authenticated prior to transmission of the whiteboard content data to the mobile device; and wherein the policy management module further to request unique identification data from the mobile device to authenticate the mobile device.

Example 39 includes the subject matter of any of Examples 29-38, and wherein the policy management module further to (i) determine whether the mobile device is located within a reference range of the smart whiteboard device and (ii) clear the whiteboard content data displayed on the display in response to determining that the mobile device is not located within the reference range of the smart whiteboard device.

Example 40 includes a method for transferring whiteboard content to another smart whiteboard device. The method includes displaying, on a smart whiteboard device, whiteboard content data; storing, on the smart whiteboard device, the whiteboard content data displayed on the smart whiteboard device in a data storage of the smart whiteboard device; preparing, on the smart whiteboard device, the whiteboard content data for transfer to a mobile device; and transmitting, on the smart whiteboard device, the whiteboard content data to the mobile device for subsequent transfer to the another smart whiteboard device, the whiteboard content data transmitted to the mobile device using a communication data exchange via a communication channel.

Example 41 includes the subject matter of Example 40, and wherein the communication channel being initially established using a near-field communication exchange.

Example 42 includes the subject matter of any of Examples 40 and 41, and wherein preparing the whiteboard content data for transfer to a mobile device includes generating a Quick Response code, the Quick Response code includes at least one of a uniform resource locator or a network address of the smart whiteboard device from which the another smart whiteboard device can retrieve the whiteboard content data; and wherein transmitting the whiteboard content data to the mobile device using a communication data exchange includes displaying the generated Quick Response code for capture by the mobile device.

Example 43 includes the subject matter of any of Examples 40-42, and wherein preparing the whiteboard content data for transfer to a mobile device includes generating a near-field communication tag, the near-field communication tag includes at least one of a uniform resource locator or a network address of the smart whiteboard device from which the another smart whiteboard device can retrieve the whiteboard content data; and wherein transmitting the whiteboard content data to the mobile device using a communication data exchange includes enabling the generated near-field communication tag to be read by the mobile device.

Example 44 includes the subject matter of any of Examples 40-43, and wherein preparing the whiteboard content data for transfer to a mobile device includes (i) retrieving the whiteboard content data from the data storage and (ii) encoding the retrieved whiteboard content data to generate a near-field communication tag; and wherein transmitting the whiteboard content data to the mobile device includes enabling the near-field communication tag to be read by the mobile device.

Example 45 includes the subject matter of any of Examples 40-44, and wherein the communication data exchange includes a Bluetooth communication data exchange.

Example 46 includes the subject matter of any of Examples 40-45, and further including enabling the another smart whiteboard device to directly retrieve the whiteboard content data.

Example 47 includes the subject matter of any of Examples 40-46, and further including sending an electronic mail message to an electronic mail address of a user in response to authenticating the user via a user identification badge.

Example 48 includes the subject matter of any of Examples 40-47, and further including enforcing one or more policies, the one or more policies include one or more rules for transferring the whiteboard content data to the mobile device.

Example 49 includes the subject matter of any of Examples 40-48, and wherein the one or more policies include a rule requiring the mobile device to be authenticated prior to transmission of the whiteboard content data to the mobile device; and wherein the method further including requesting unique identification data from the mobile device to authenticate the mobile device.

Example 50 includes the subject matter of any of Examples 40-49, and the method further including determining whether the mobile device is located within a reference range of the smart whiteboard device; and clearing the whiteboard content data being displayed in response to determining that the mobile device is not located within the reference range of the smart whiteboard device.

Example 51 includes a smart whiteboard device to transfer whiteboard content to another smart whiteboard device. The smart whiteboard device includes a processor; and a memory having stored therein a plurality of instructions that when executed by the processor cause the smart whiteboard device to perform the method of any of Examples 40-50.

Example 52 includes one or more machine readable media including a plurality of instructions stored thereon that in response to being executed result in a smart whiteboard device performing the method of any of Examples 40-50.

Example 53 includes a smart whiteboard device to receive whiteboard content transferred from another smart whiteboard device. The smart whiteboard device includes a communication module to receive whiteboard content data from a mobile device with a communication data exchange via a communication channel, the whiteboard content data received from the mobile device is first transferred from the another smart whiteboard device; a content management module to process the whiteboard content data received from the mobile device; a data storage to store the whiteboard content data received from the mobile device; and a display to display the received whiteboard content data.

Example 54 includes the subject matter of Example 53, and wherein the communication channel is initially established with a near-field communication exchange.

Example 55 includes the subject matter of any of Examples 53 and 54, and wherein to receive whiteboard content data from a mobile device includes to capture a Quick Response code displayed by the mobile device, the Quick Response code includes at least one of a uniform resource locator or a network address of the another smart whiteboard device from which smart whiteboard device can retrieve the whiteboard content data; wherein to process the whiteboard content data received from the mobile device includes to decode the Quick Response code captured from the mobile device to obtain the at least one of the uniform resource locator or the network address of the another smart whiteboard device; and wherein the content management module further to retrieve the whiteboard content data from the another smart whiteboard device as a function of at least one of the uniform resource locator or the network address of the another smart whiteboard device.

Example 56 includes the subject matter of any of Examples 53-55, and wherein to receive whiteboard content data from a mobile device includes to read a near-field communication tag generated by the mobile device, the near-field communication tag includes at least one of a uniform resource locator or a network address of the another smart whiteboard device from which smart whiteboard device can retrieve the whiteboard content data; wherein to process the whiteboard content data received from the mobile device includes to decode the near-field communication tag read from the mobile device to obtain the at least one of the uniform resource locator or the network address of the another smart whiteboard device; and wherein the content management module further to retrieve the whiteboard content data from the another smart whiteboard device as a function of at least one of the uniform resource locator or the network address of the another smart whiteboard device.

Example 57 includes the subject matter of any of Examples 53-56, and wherein to receive whiteboard content data from a mobile device includes to read a near-field communication tag generated by the mobile device, the near-field communication tag includes the whiteboard content data first transferred from the another smart whiteboard device; and wherein to process the whiteboard content data received from the mobile device includes to (i) decode the near-field communication tag read from the mobile device to obtain the whiteboard content data and (ii) display the obtained whiteboard content data on the display of the smart whiteboard device.

Example 58 includes the subject matter of any of Examples 53-57, and wherein the communication data exchange includes a Bluetooth communication data exchange.

Example 59 includes the subject matter of any of Examples 53-58, and further including a policy management module to enforce one or more policies, the one or more policies include one or more rules to receive the whiteboard content data from the mobile device.

Example 60 includes the subject matter of any of Examples 53-59, and wherein the one or more policies include a rule to require the mobile device to be authenticated prior to receiving the whiteboard content data from the mobile device; and wherein the policy management module to request unique identification data from the mobile device to authenticate the mobile device.

Example 61 includes the subject matter of any of Examples 53-60, and wherein the policy management module further to (i) determine whether the mobile device is located within a reference range of the smart whiteboard device and (ii) clear the whiteboard content data displayed on the display in response to determining that the mobile device is not located within the reference range of the smart whiteboard device.

Example 62 includes a method for receiving whiteboard content transferred from a smart whiteboard device. The method includes receiving, on a smart whiteboard device, whiteboard content data from a mobile device using a communication data exchange via a communication channel, the whiteboard content data received from the mobile device first being transferred from another smart whiteboard device; processing, on the smart whiteboard device, the whiteboard content data received from the mobile device; storing, on the smart whiteboard device, the whiteboard content data received from the mobile device in a data storage of the smart whiteboard device; and displaying, on the smart whiteboard device, the received whiteboard content data on a display of the smart whiteboard device.

Example 63 includes the subject matter of Example 62, and wherein the communication channel being initially established using a near-field communication exchange.

Example 64 includes the subject matter of any of Examples 62 and 63, and wherein receiving whiteboard content data from a mobile device includes capturing a Quick Response code displayed by the mobile device, the Quick Response code includes at least one of a uniform resource locator or a network address of the another smart whiteboard device from which smart whiteboard device can retrieve the whiteboard content data; wherein processing the whiteboard content data received from the mobile device includes decoding the Quick Response code captured from the mobile device to obtain the at least one of the uniform resource locator or the network address of the another smart whiteboard device; and wherein the method further including retrieving the whiteboard content data from the another smart whiteboard device as a function of at least one of the uniform resource locator or the network address of the another smart whiteboard device.

Example 65 includes the subject matter of any of Examples 62-64, and wherein receiving whiteboard content data from a mobile device includes reading a near-field communication tag generated by the mobile device, the near-field communication tag includes at least one of a uniform resource locator or a network address of the another smart whiteboard device from which smart whiteboard device can retrieve the whiteboard content data; wherein processing the whiteboard content data received from the mobile device includes decoding the near-field communication tag read from the mobile device to obtain the at least one of the uniform resource locator or the network address of the another smart whiteboard device; and wherein the method further including retrieving the whiteboard content data from the another smart whiteboard device as a function of at least one of the uniform resource locator or the network address of the another smart whiteboard device.

Example 66 includes the subject matter of any of Examples 62-65, and wherein receiving whiteboard content data from a mobile device includes reading a near-field communication tag generated by the mobile device, the near-field communication tag includes the whiteboard content data first transferred from the another smart whiteboard device; and wherein processing the whiteboard content data received from the mobile device includes (i) decoding the near-field communication tag read from the mobile device to obtain the whiteboard content data and (ii) displaying the obtained whiteboard content data on the display of the smart whiteboard device.

Example 67 includes the subject matter of any of Examples 62-66, and wherein the communication data exchange includes a Bluetooth communication data exchange.

Example 68 includes the subject matter of any of Examples 62-67, and further including enforcing one or more policies, the one or more policies include one or more rules for receiving the whiteboard content data from the mobile device.

Example 69 includes the subject matter of any of Examples 62-68, and wherein the one or more policies include a rule requiring the mobile device to be authenticated prior to receiving the whiteboard content data from the mobile device; and wherein the method further including requesting unique identification data from the mobile device to authenticate the mobile device.

Example 70 includes the subject matter of any of Examples 62-69, and further including determining whether the mobile device is located within a reference range of the smart whiteboard device; and clearing the whiteboard content data being displayed on the display in response to determining that the mobile device is not located within the reference range of the smart whiteboard device.

Example 71 includes a smart whiteboard device to receive whiteboard content from another smart whiteboard device. The smart whiteboard device includes a processor; and a memory having stored therein a plurality of instructions that when executed by the processor cause the smart whiteboard device to perform the method of any of Examples 62-70.

Example 72 includes one or more machine readable media including a plurality of instructions stored thereon that in response to being executed result in a smart whiteboard device performing the method of any of Examples 62-70.

The invention claimed is:

1. A smart whiteboard device to transfer whiteboard content to another smart whiteboard device, the smart whiteboard device comprising:
   a display to display whiteboard content data;
   a data storage to store the displayed whiteboard content data;
   a content management module to prepare the whiteboard content data for transfer to a mobile device;
   a communication module to transmit the whiteboard content data to the mobile device for subsequent transfer to the another smart whiteboard device, the communication module to transmit the whiteboard content data to the mobile device with a communication data exchange via a communication channel, wherein the communication channel comprises a communication channel initially established with a near-field communication exchange; and a policy management module to enforce one or more policies, wherein the one or more policies comprise one or more rules for transfer of the whiteboard content data to the mobile device.

2. The smart whiteboard device of claim 1, wherein to prepare the whiteboard content data for transfer to a mobile device comprises (i) to retrieve the whiteboard content data from the data storage and (ii) encode the whiteboard content data to generate a near-field communication tag; and
wherein to transmit the whiteboard content data to the mobile device comprises to enable the near-field communication tag to be read by the mobile device.

3. The smart whiteboard device of claim 1, further comprising a web server module, the web server module to at least one or more of (i) enable the another smart whiteboard device to directly retrieve the whiteboard content data or (ii) send an electronic mail message to an electronic mail address of a user in response to authentication of the user by the smart whiteboard device via a user identification badge.

4. The smart whiteboard device of claim 1, wherein the one or more policies comprise a rule to require the mobile device to be authenticated prior to transmission of the whiteboard content data to the mobile device; and
wherein the policy management module further to request unique identification data from the mobile device to authenticate the mobile device.

5. The smart whiteboard device of claim 1, wherein the policy management module further to (i) determine whether the mobile device is located within a reference range of the smart whiteboard device and (ii) clear the whiteboard content data displayed on the display in response to determining that the mobile device is not located within the reference range of the smart whiteboard device.

6. One or more computer-readable storage media comprising a plurality of instructions stored thereon that in response to being executed cause a smart whiteboard device to:
display whiteboard content data on a display of the smart whiteboard device;
store the displayed whiteboard content data in a data storage of the smart white board device;
prepare the whiteboard content data for transfer to a mobile device;
transmit, using a communication data exchange via a communication channel, the whiteboard content data to the mobile device for subsequent transfer to the another smart whiteboard device, wherein the communication channel comprises a communication channel initially established with a near-field communication exchange; and
enforce one or more policies, wherein the one or more policies comprise one or more rules for transfer of the whiteboard content data to the mobile device.

7. The one or more computer-readable storage media device of claim 6, wherein to prepare the whiteboard content data for transfer to the mobile device comprises (i) to retrieve the whiteboard content data from the data storage and (ii) encode the whiteboard content data to generate a near-field communication tag; and
wherein to transmit the whiteboard content data to the mobile device comprises to enable the near-field communication tag to be read by the mobile device.

8. The one or more computer-readable storage media of claim 6, further comprising a plurality of instructions that in response to being executed cause the smart whiteboard to at least one of (i) enable the another smart whiteboard device to directly retrieve the whiteboard content data or (ii) send an electronic mail message to an electronic mail address of a user in response to authentication of the user by the smart whiteboard device via a user identification badge.

9. The one or more computer-readable storage media of claim 6, wherein the one or more policies comprise a rule to require the mobile device to be authenticated prior to transmission of the whiteboard content data to the mobile device; and
wherein the policy management module further to request unique identification data from the mobile device to authenticate the mobile device.

10. The one or more computer-readable storage media of claim 6, further comprising a plurality of instructions that in response to being executed cause the smart whiteboard to:
determine whether the mobile device is located within a reference range of the smart whiteboard device; and
clear the whiteboard content data displayed on the display in response to determining that the mobile device is not located within the reference range of the smart whiteboard device.

11. A method for transferring whiteboard content from a smart whiteboard device to another smart whiteboard device, the method comprising:
displaying, by a first smart whiteboard device, whiteboard content data;
storing, by the first smart whiteboard device, the displayed whiteboard content data;
preparing, by the first smart whiteboard device, the whiteboard content data for transfer to a mobile device;
transmitting, by the first smart whiteboard device using a communication data exchange via a communication channel, the whiteboard content data to the mobile device for subsequent transfer to a second smart whiteboard device, wherein the communication channel is initially established with a near-field communication exchange; and
enforcing, by the first smart whiteboard device, one or more policies, wherein the one or more policies comprise one or more rules for transfer of the whiteboard content data to the mobile device.

12. The method of claim 11, wherein preparing the whiteboard content data for transfer to a mobile device comprises (i) retrieving the whiteboard content data from the data storage and (ii) encoding the whiteboard content data to generate a near-field communication tag; and
wherein transmitting the whiteboard content data to the mobile device comprises enabling the near-field communication tag to be read by the mobile device.

13. The method of claim 11, further comprising, in response to authentication of the user by the smart whiteboard device via a user identification badge, enabling the second smart whiteboard device to directly retrieve the whiteboard content data.

14. The method of claim 11, further comprising, in response to authentication of the user by the smart whiteboard device via a user identification badge, sending an electronic mail message to an electronic mail address of a user.

15. The method of claim 11, wherein the one or more policies comprise a rule to require the mobile device to be authenticated prior to transmission of the whiteboard content data to the mobile device, and
further comprising requesting unique identification data from the mobile device to authenticate the mobile device.

16. The method of claim 11, further comprising:
determining whether the mobile device is located within a reference range of the smart whiteboard device; and clearing the whiteboard content data displayed on the display in response to determining that the mobile device is not located within the reference range of the smart whiteboard device.

* * * * *